(12) United States Patent
Gao et al.

(10) Patent No.: US 10,804,979 B2
(45) Date of Patent: Oct. 13, 2020

(54) METHOD AND DEVICE FOR ACQUIRING AND FEEDING BACK TRANSMISSION BEAM INFORMATION

(71) Applicant: China Academy of Telecommunications Technology, Beijing (CN)

(72) Inventors: Qiubin Gao, Beijing (CN); Runhua Chen, Beijing (CN); Tamrakar Rakesh, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/499,260

(22) PCT Filed: Mar. 21, 2018

(86) PCT No.: PCT/CN2018/079889
§ 371 (c)(1),
(2) Date: Sep. 28, 2019

(87) PCT Pub. No.: WO2018/177183
PCT Pub. Date: Oct. 4, 2018

(65) Prior Publication Data
US 2020/0028547 A1    Jan. 23, 2020

(30) Foreign Application Priority Data
Mar. 31, 2017  (CN) .......................... 2017 1 0210708

(51) Int. Cl.
*H04B 7/0408*  (2017.01)
*H04B 7/0452*  (2017.01)
(Continued)

(52) U.S. Cl.
CPC ......... *H04B 7/0417* (2013.01); *H04B 7/0408* (2013.01); *H04W 72/046* (2013.01); *H04B 7/0452* (2013.01)

(58) Field of Classification Search
CPC .. H04B 7/0417; H04B 7/0408; H04B 7/0452; H04W 72/046
See application file for complete search history.

(56) References Cited

U.S. PATENT DOCUMENTS

2013/0223251 A1*  8/2013  Li ........................ H04B 7/0619
                                                                  370/252
2014/0187168 A1    7/2014  Seol et al.
(Continued)

FOREIGN PATENT DOCUMENTS

CN    103475397 A    12/2013
CN    103733542 A     4/2014
(Continued)

OTHER PUBLICATIONS

Huawei, Hisilico, "Discussion on downlink beam measurement and UE reporting procedure," 3GPP TSG-RAN WG1 NR Ad hoc Meeting, R1-1700039, Spokan, USA, Jan. 16-20, 2017.
(Continued)

*Primary Examiner* — Ted M Wang
(74) *Attorney, Agent, or Firm* — Foley & Lardner LLP

(57) ABSTRACT

Disclosed in the present invention are a method and device for acquiring and feeding back transmission beam information, comprising: a base station transmits, to a terminal, reference signals and information related to reference signal set division by using downlink transmission beams, wherein the base station transmits a reference signal for each downlink transmission beam, the reference signal of each beam is issued after being formed by using a beam forming weight corresponding to the beam, and the reference signals transmitted using the downlink transmission beams from the
(Continued)

same beam group are divided into a reference signal set; the terminal selects Q reference signals from the received reference signals according to the reception quality and according to the information related to reference signal set division, selects a downlink transmission beam combination, and reports to the base station.

20 Claims, 7 Drawing Sheets

(51) Int. Cl.
*H04B 7/0417* (2017.01)
*H04W 72/04* (2009.01)

(56) References Cited

U.S. PATENT DOCUMENTS

| | | |
|---|---|---|
| 2015/0049824 A1 | 2/2015 | Kim et al. |
| 2015/0257073 A1 | 9/2015 | Park et al. |
| 2016/0285660 A1 | 9/2016 | Frenne et al. |
| 2016/0337056 A1* | 11/2016 | Frenne .................. H04B 7/0695 |
| 2017/0033856 A1 | 2/2017 | Su et al. |

FOREIGN PATENT DOCUMENTS

| | | |
|---|---|---|
| CN | 105790886 A | 7/2016 |
| CN | 106470096 A | 3/2017 |
| WO | WO2015147717 A1 | 10/2015 |

OTHER PUBLICATIONS

CATT, "Discussion on beam reporting," 3GPP TSG-RAN WG1 Meeting #88, R1-1702077, Athens, Greece, Feb. 13-17, 2017.
ITRI, "Procedure of beam management and CSI acquisition," 3GPP TSG-RAN WG1 Meeting #88, R1-170238, Athens, Greece, Feb. 13-17, 2017.
Huawei et al, "Beam diversity for data and control channels", 3GPP, TSG RAN WG1 Meeting #88 R1-1701715, 3GPP, Feb. 13-17, 2017, Athens, Greece.

* cited by examiner

METHOD AND DEVICE FOR ACQUIRING AND FEEDING BACK TRANSMISSION BEAM INFORMATION

CROSS REFERENCE

This application is a US National Stage of International Application No. PCT/CN2018/079889, filed on Mar. 21, 2018, designating the United States and claiming the priority of Chinese Patent Application No. CN201710210708.3, filed with the Chinese Patent Office on Mar. 31, 2017, and entitled "A method and device for obtaining transmitting beam information, and a method and device for feeding back transmitting beam information". The entire content of each the disclosures is incorporated herein by reference.

FIELD

The present disclosure relates to the field of wireless communications, and particularly to a method and device for obtaining transmitting beam information, and a method and device for feeding back transmitting beam information.

BACKGROUND

In view of the importance of the Multiple-Input Multiple-Output (hereinafter "MIMO") technology to the improvement of peak rates and system spectrum utilization, radio access technologies such as the Long Term Evolution (hereinafter "LTE") and LTE-advanced (hereinafter "LTE-A") have been developed upon the basis of MIMO plus Orthogonal Frequency Division Multiplexing (hereinafter "OFDM") technologies. Performance gains of the MIMO technology stem from spatial degrees of freedom offered by multi-antenna systems. Therefore, a most important evolvement direction during standardization of the MIMO technology is to increase the number of spatial dimensions.

In the LTE Release (hereinafter "Rel")-8, at most four layers of MIMO transmission can be supported. The LTE Rel-9 enhances the Multi-User MIMO (hereinafter "MU-MIMO") technology, where at most four downlink data layers can be supported by MU-MIMO transmission in the Transmission Mode (hereinafter "TM")-8. In the LTE Rel-10, as eight antenna ports are supported, spatial resolution of channel state information is further improved, and at most eight data layers are supported by Single-User MIMO (hereinafter "SU-MIMO"). In the LTE Rel-13 and Rel-14, the Full-Dimension MIMO (hereinafter "FD-MIMO") technology is introduced to support 32 antenna ports, thereby forming beams in both horizontal and vertical directions, which cover anywhere in three-dimensional spaces.

In order to further improve the MIMO technology, the massive antenna array technology is introduced to mobile communication systems. For a base station, an all-digital massive antenna array can include up to 128, 256 or 512 antenna elements, and up to 128, 256 or 512 transceiver units, where each antenna element is connected with one of the transceiver units. Pilot signals of up to 128, 256 or 512 antenna ports are transmitted so that the terminal measures and feeds back channel state information. The terminal can also be configured with an antenna array consisting of up to 32 or 64 antenna elements. A significant beamforming gain caused by beamforming at both the base station's side and the terminal's side compensates for signal attenuation arising from path loss. The coverage of radio signals is especially limited due to path loss for high-frequency communications, e.g., communications at the frequency 30 GHz. The coverage of radio signals can be extended to a practical range by using the massive antenna array technology.

Each antenna element in an all-digital antenna array includes a separate transceiver unit, so the size, cost, and power consumption of the device are greatly increased. Particularly, in the past ten years, power consumption of Analog to Digital Converters (hereinafter "ADCs") and Digital to Analog Converters (hereinafter "DACs") of the transceiver units has only decreased by approximately 1/10, and improvement of their performance has only been insignificant. In order to lower the size, cost, and power consumption of the device, a technical solution based upon analog beamforming has been proposed as illustrated by FIG. 1 and FIG. 2. FIG. 1 is a schematic diagram of weighted analog beamforming at an intermediate frequency. FIG. 2 is a schematic diagram of weighted analog beamforming at a radio frequency. A general characteristic of analog beamforming is using phase shifters to perform weighted beamforming on a signal at an intermediate frequency (FIG. 1) or at a radio frequency (FIG. 2). An advantage of analog beamforming lies in that there is only one transceiver unit common to all the transmission (or receiving) antennas, so the device can be simple in structure, and the size, cost, and power consumption thereof can be lowered.

In order to further improve the performance of analog beamforming, a hybrid digital and analog beamforming structure has been proposed. As illustrated by FIG. 3, a transmitting end and a receiving end each include $N_{RF}^T$ and $N_{RF}^R$ transceivers, where the number of antenna elements at the transmitting end $N^T > N_{RF}^T$, and the number of antenna elements at the receiving end $N^R > N_{RF}^R$; and the largest number of parallel transmission streams supported by the beamforming is $\min(N_{RF}^T, N_{RF}^R)$. The hybrid beamforming structure illustrated by FIG. 3 makes a tradeoff between the flexibility of digital beamforming and the low complexity of analogy beamforming so that both multiple data streams can be supported and beamforming can be performed on multiple users concurrently, and reasonable complexity can be achieved.

Both the analog beamforming and the hybrid digital and analog beamforming require adjustment of analog beamforming weights at both the transmitting end and the receiving end to aim the formed beam at the other communication end. For downlink transmission, beamforming weights for transmission at the base station's side and beamforming weights for reception at the terminal's side need to be adjusted. For uplink transmission, beamforming weights for transmission at the terminal's side, and beamforming weights for reception at the base station's side need to be adjusted. The beamforming weights are typically obtained by transmitting training signals. In the downlink direction, the base station transmits a downlink beam training signal and the terminal measures the downlink beam training signal, selects an optimum transmitting beam of the base station, feeds information about the beam back to the base station, selects a corresponding optimum receiving beam and stores it locally.

A drawback of the existing technology is that the fed-back information about the beam is inaccurate.

SUMMARY

Embodiments of the disclosure provide a method and device for obtaining transmitting beam information, and a method and device for feeding back transmitting beam information.

In a first aspect, an embodiment of the disclosure provides a method for obtaining transmitting beam information. The method includes: transmitting, by a base station, reference signals to a terminal using downlink transmitting beams; transmitting, by the base station, information about sets of reference signals to the terminal; receiving, by the base station, a combination of downlink transmitting beams reported by the terminal; and determining, by the base station, a downlink transmitting beam for transmitting data to the terminal, according to the combination of downlink transmitting beams. The base station transmits one of the reference signals for each of the downlink transmitting beams. The reference signal of each of the downlink transmitting beams is transmitted after the downlink transmitting beam is formed using a beamforming weight corresponding to the downlink transmitting beam. Reference signals transmitted using downlink transmitting beams in a same group of downlink transmitting beams are grouped into one of the sets of reference signals.

According to an implementation mode of the embodiment of the disclosure, when the base station transmits the reference signals to the terminal using the downlink transmitting beams in different groups of beams concurrently, downlink transmitting beams transmitted from a same transmitting and receiving point (hereinafter "TRP") are a group of beams, or, downlink transmitting beams transmitted from a transceiver unit are a group of beams.

According to an implementation mode of the embodiment of the disclosure, transmitting, by the base station, the reference signals to the terminal using the downlink transmitting beams and transmitting, by the base station, one of the reference signals for each of the downlink transmitting beams includes: mapping the reference signal of one of the downlink transmitting beams onto all ports on all transmission occasions of a reference signal source, and transmitting the reference signal via the ports. Or, transmitting, by the base station, one of the reference signals for each of the downlink transmitting beams includes: mapping the reference signal of one of the downlink transmitting beams onto all ports on at least one transmission occasion of a reference signal source, and transmitting the reference signal via the ports. Or, transmitting, by the base station, one of the reference signals for each of the downlink transmitting beams includes: mapping the reference signal of one of the downlink transmitting beams onto at least one port on at least one transmission occasion of a reference signal source, and transmitting the reference signal via the port.

According to an implementation mode of the embodiment of the disclosure, transmitting, by the base station, the information about the sets of reference signals to the terminal includes: notifying, by the base station, the terminal of configuration information of the sets of reference signals by notifying the terminal of configuration information of sets of reference signal resources when the base station configures the terminal with H sets of reference signal resources, an h-th set of the H sets includes $N_h$ reference signal resources, and the reference signal of one of the downlink transmitting beams is transmitted via all ports on all transmission occasions of one of the reference signal resources. Or, transmitting, by the base station, the information about the sets of reference signals to the terminal includes: notifying, by the base station, the terminal of the configuration information of the sets of reference signals by notifying the terminal of the configuration information of the sets of reference signal resources and of antenna ports when the base station configures the terminal with F sets of reference signal resources, an f-th set of the F sets includes $N_f$ reference signal resources, each of the reference signal resources has $N_p$ antenna ports, and the reference signal of one of the downlink transmitting beams is transmitted via one of the antenna ports of each of the reference signal resources.

According to an implementation mode of the embodiment of the disclosure, the combination of downlink transmitting beams received by the base station is identification information of Q reference signals selected by the terminal from the transmitted reference signals and information about groups of reference signals including the Q reference signals.

According to an implementation mode of the embodiment of the disclosure, the method further includes: receiving, by the base station, information about groups of reference signals transmitted by the terminal. Determining, by the base station, the downlink transmitting beam for transmitting data to the terminal, according to the combination of downlink transmitting beams includes: determining, by the base station, that the downlink transmitting beams of two of the reference signals can be transmitted concurrently when the two reference signals belong to a same group of reference signals, where the downlink transmitting beams corresponding to the reference signals in the same group of reference signals constitute the combination of downlink transmitting beams. Or, determining, by the base station, the downlink transmitting beam for transmitting data to the terminal, according to the combination of downlink transmitting beams includes: determining, by the base station, that the downlink transmitting beam of two of the reference signals can be transmitted concurrently when the two reference signals belong to different groups of reference signals, where the downlink transmitting beams corresponding to the reference signals in different groups of reference signals constitute the combination of downlink transmitting beams.

According to an implementation mode of the embodiment of the disclosure, the method further includes: receiving, by the base station, an overall reception quality of groups of reference signals reported by the terminal.

In a second aspect, an embodiment of the disclosure provides a method for feeding back beam information. The method includes: receiving, by a terminal, reference signals transmitted by a base station using downlink transmitting beams, selecting, by the terminal, Q reference signals from the received reference signals according to reception qualities thereof, and determining a receiving beam of each of the Q reference signals; and receiving, by the terminal, information about sets of reference signals transmitted by the base station, selecting a combination of downlink transmitting beams according to the information about the sets of reference signals, and reporting the combination of downlink transmitting beams to the base station. The base station transmits one of the reference signals for each of the downlink transmitting beams. The reference signal of each of the downlink transmitting beams is transmitted after the downlink transmitting beam is formed using a beamforming weight corresponding to the downlink transmitting beam. Reference signals transmitted using downlink transmitting beams in a same group of beams are grouped into one of the sets of reference signals.

According to an implementation mode of the embodiment of the disclosure, assuming that the terminal has $N_R^{UE}$ receiving beams, and each of the receiving beams corresponds to a group of beamforming weights. Determining the receiving beam of each of the Q reference signals includes: for each of the Q reference signals, receiving, by the terminal, the reference signal using each of the receiving beams, respectively, and selecting the receiving beam having a highest received signal power as the receiving beam of the reference signal.

According to an implementation mode of the embodiment of the disclosure, reference signals of different downlink transmitting beams in the combination of downlink transmitting beams belong to different sets of reference signals.

According to an implementation mode of the embodiment of the disclosure, selecting the combination of downlink transmitting beams includes: selecting reference signals belonging to a same set of reference signals among the Q reference signals as a group of reference signals, and determining downlink transmitting beams corresponding to reference signals in different groups of reference signals as the combination of downlink transmitting beams. Or, selecting the combination of downlink transmitting beams includes: selecting reference signals belonging to a plurality of sets of reference signals among the Q reference signals as a group of reference signals, and determining downlink transmitting beams corresponding to reference signals in different groups of reference signals as the combination of downlink transmitting beams. Or, selecting the combination of downlink transmitting beams includes: selecting reference signals belonging to different sets of reference signals among the Q reference signals as a group of reference signals, where any two reference signals in the same group of reference signals do not belong to a same set of reference signals, and determining a combination of downlink transmitting beams corresponding to reference signals in the same group of reference signals as the combination of downlink transmitting beams.

According to an implementation mode of the embodiment of the disclosure, when selecting and reporting the combination of downlink transmitting beams to the base station, the terminal reports identification information of the selected Q reference signals, and information about groups of reference signals including the Q reference signals.

According to an implementation mode of the embodiment of the disclosure, the method further includes: reporting, by the terminal, an overall reception quality of groups of reference signals to the base station.

In a third aspect, an embodiment of the disclosure provides a device for obtaining transmitting beam information. The device includes: a reference signal transmitting module, a report receiving module and a beam determining module. The reference signal transmitting module is configured to transmit reference signals to a terminal using downlink transmitting beams and transmit information about sets of the reference signals to the terminal. The reference signal transmitting module transmits one of the reference signals for each of the downlink transmitting beams. The reference signal of each of the downlink transmitting beams is transmitted after the downlink transmitting beam is formed using a beamforming weight corresponding to the downlink transmitting beam. Reference signals transmitted using downlink transmitting beams in a same group of downlink transmitting beams are grouped into one of the sets of reference signals. The report receiving module is configured to receive a combination of downlink transmitting beams reported by the terminal. The beam determining module is configured to determine a downlink transmitting beam for transmitting data to the terminal, according to the combination of downlink transmitting beams.

According to an implementation mode of the embodiment of the disclosure, when the reference signal transmitting module is further configured to transmit the reference signals to the terminal using the downlink transmitting beams in different groups of beams concurrently, downlink transmitting beams transmitted from a same TRP are a group of beams; or, downlink transmitting beams transmitted from a transceiver unit are a group of beams.

According to an implementation mode of the embodiment of the disclosure, the reference signal transmitting module is further configured to transmit one of the reference signals for each of the downlink transmitting beams by: mapping the reference signal of one of the downlink transmitting beams onto all ports on all transmission occasions of a reference signal source, and transmitting the reference signal via the ports. Or, the reference signal transmitting module is further configured to transmit one of the reference signals for each of the downlink transmitting beams by: mapping the reference signal of one of the downlink transmitting beams onto all ports on at least one transmission occasion of a reference signal source, and transmitting the reference signal via the ports. Or, the reference signal transmitting module is further configured to transmit one of the reference signals for each of the downlink transmitting beams by: mapping the reference signal of one of the downlink transmitting beams onto at least one port on at least one transmission occasion of a reference signal source, and transmitting the reference signal via the port.

According to an implementation mode of the embodiment of the disclosure, the reference signal transmitting module is further configured to: notify the terminal of configuration information of the sets of reference signals by notifying the terminal of configuration information of sets of reference signal resources when the terminal is configured with H sets of reference signal resources, an h-th set of the H sets includes $N_h$ reference signal resources, and the reference signal of one of the downlink transmitting beams is transmitted via all ports on all transmission occasions of one of the reference signal resources. Or, the reference signal transmitting module is further configured to: notify the terminal of the configuration information of the sets of reference signals by notifying the terminal of the configuration information of the sets of reference signal resources and of antenna ports when the terminal is configured with F sets of reference signal resources, an f-th set of the F sets includes $N_f$ reference signal resources, each of the reference signal resources has $N_p$ antenna ports, and the reference signal of one of the downlink transmitting beams is transmitted via one of the antenna ports of each of the reference signal resources.

According to an implementation mode of the embodiment of the disclosure, when receiving the combination of downlink transmitting beams reported by the terminal, the report receiving module is further configured to receive identification information of Q reference signals selected by the terminal from the transmitted reference signals and information about groups of reference signals including the Q reference signals.

According to an implementation mode of the embodiment of the disclosure, the beam determining module is further configured to determine the downlink transmitting beam for transmitting data to the terminal, according to the combination of downlink transmitting beams upon reception of information about groups of reference signals transmitted by the terminal by: determining that the downlink transmitting beams of two of the reference signals can be transmitted concurrently when the two reference signals belong to a same group of reference signals, where the downlink transmitting beams corresponding to the reference signals in the same group of reference signals constitute the combination of downlink transmitting beams. Or, the beam determining module is further configured to determine the downlink transmitting beam for transmitting data to the terminal, according to the combination of downlink transmitting beams upon reception of information about groups of reference signals transmitted by the terminal by: determining that the downlink transmitting beam of two of the reference signals can be transmitted concurrently when the two reference signals belong to different groups of reference signals, where the downlink transmitting beams corresponding to the reference signals in different groups of reference signals constitute the combination of downlink transmitting beams.

According to an implementation mode of the embodiment of the disclosure, the report receiving module is further configured to receive an overall reception quality of groups of reference signals reported by the terminal.

In a fourth aspect, an embodiment of the disclosure provides a device for feeding back beam information. The device includes a receiving module, a determining module and a reporting module. The receiving module is configured to receive reference signals transmitted by a base station using downlink transmitting beams and receive information about sets of the reference signals transmitted by the base station, where the base station transmits one of the reference signals for each of the downlink transmitting beams, the reference signal of each of the downlink transmitting beams is transmitted after the downlink transmitting beam is formed using a beamforming weight corresponding to the downlink transmitting beam, and reference signals transmitted using downlink transmitting beams in a same group of beams are grouped into one of the sets of reference signals. The determining module is configured to select Q reference signals from the received reference signals according to reception qualities thereof and determine a receiving beam of each of the Q reference signals. The reporting module is configured to select a combination of downlink transmitting beams according to the information about the sets of reference signals and report the combination of downlink transmitting beams to the base station.

According to an implementation mode of the embodiment of the disclosure, assuming that the terminal has $N_R^{UE}$ a receiving beams, each of the receiving beams corresponds to a group of beamforming weights. When determining the receiving beam of each of the Q reference signals, the determining module is further configured to: for each of the Q reference signals, receive the reference signal using each of the receiving beams, respectively, and select the receiving beam having a highest received signal power as the receiving beam of the reference signal.

According to an implementation mode of the embodiment of the disclosure, reference signals of different downlink transmitting beams in the combination of downlink transmitting beams belong to different sets of reference signals.

According to an implementation mode of the embodiment of the disclosure, the reporting module is further configured to select the combination of downlink transmitting beams by selecting reference signals belonging to a same set of reference signals among the Q reference signals as a group of reference signals, and determining downlink transmitting beams corresponding to reference signals in different groups of reference signals as the combination of downlink transmitting beams. Or, the reporting module is further configured to select the combination of downlink transmitting beams by selecting reference signals belonging to a plurality of sets of reference signals among the Q reference signals as a group of reference signals, and determining downlink transmitting beams corresponding to reference signals in different groups of reference signals as the combination of downlink transmitting beams. Or, the reporting module is further configured to select the combination of downlink transmitting beams by selecting reference signals belonging to different sets of reference signals among the Q reference signals as a group of reference signals, where any two reference signals in the same group of reference signals do not belong to a same set of reference signals, and determining a combination of downlink transmitting beams corresponding to reference signals in the same group of reference signals as the combination of downlink transmitting beams.

According to an implementation mode of the embodiment of the disclosure, the reporting module is configured to report identification information of the selected Q reference signals and information about groups of reference signals including the Q reference signals when selecting and reporting the combination of downlink transmitting beams.

According to an implementation mode of the embodiment of the disclosure, the reporting module is further configured to report an overall reception quality of groups of reference signals to the base station.

In a fifth aspect, an embodiment of the disclosure provides a base station. The base station includes a processor, a transceiver, and a memory. The transceiver is configured to transmit and receive data under control of the processor. The processor is configured to read a program in the memory to perform the method according to any one of the implementation modes of the embodiment in the first aspect above.

In a sixth aspect, an embodiment of the disclosure provides a terminal. The terminal includes a processor a transceiver, and a memory. The transceiver is configured to transmit and receive data under control of the processor. The processor is configured to read a program in the memory to perform the method according to any one of the implementation modes of the embodiment in the second aspect above.

In a seventh aspect, an embodiment of the disclosure provides a computer readable storage medium, having stored thereon computer executable instructions that, when executed, cause a computer to perform the method according to any one of the implementation modes of the embodiment in the first aspect above.

In an eighth aspect, an embodiment of the disclosure provides a computer readable storage medium, having stored thereon computer executable instructions that, when executed, cause a computer to perform the method according to any one of the implementation modes of the embodiment in the second aspect above.

In the technical solutions according to the embodiments of the disclosure, at the base station's side, a base station transmits reference signals to a terminal using downlink transmitting beams, and transmits information about sets of reference signals to the terminal. At the terminal's side, the terminal selects a combination of downlink transmitting beams to be recommended for the base station to use according to the reference signals and the information about the sets of reference signals, and reports the combination of downlink transmitting beams to the base station.

BRIEF DESCRIPTION OF THE DRAWINGS

The drawings described below are intended to facilitate further understanding of the disclosure and constitute a part of the disclosure. The embodiments of the disclosure and the description thereof are intended to explain the disclosure, but not to limit the disclosure unduly.

DETAILED DESCRIPTION OF THE EMBODIMENTS

The embodiments of the disclosure provide a method and device for obtaining transmitting beam information, and a method and device for feeding back transmitting beam information so as to address the problem of determining and reporting beam information so that a terminal and a base station can obtain more accurate beam combination information to better support multi-beam transmission. Particular implementation modes of embodiments of the disclosure are described below with reference to the drawings.

In the following description, embodiments at the terminal's side and at the base station's side are described, respectively, and then an embodiment in which the terminal's side and the base station's side cooperate with each other is described for better understanding of the solutions according to the embodiments of the disclosure. Such a description shall not suggest that the embodiments at the terminal's side and at the base station's side must be implemented together or that these embodiments must be implemented separately. In fact, problems at the terminal's side and at the base station's side can be addressed, respectively, when the embodiments at the terminal's side and at the base station's side are implemented separately, and a better technical effect can be achieved when the embodiments are implemented together.

Figure 1:
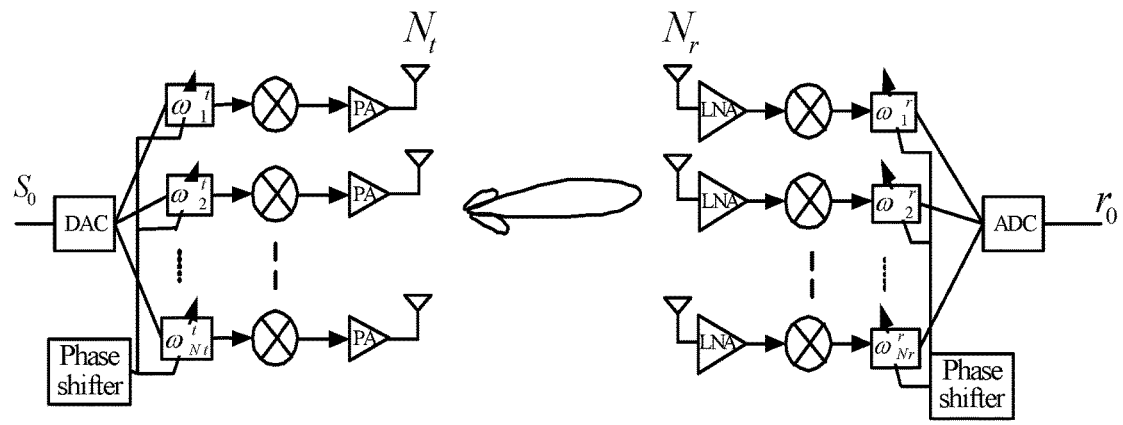
FIG. 1 is a schematic diagram of existing analog beamforming for weighted beamforming of a signal at an intermediate frequency.
Figure 2:
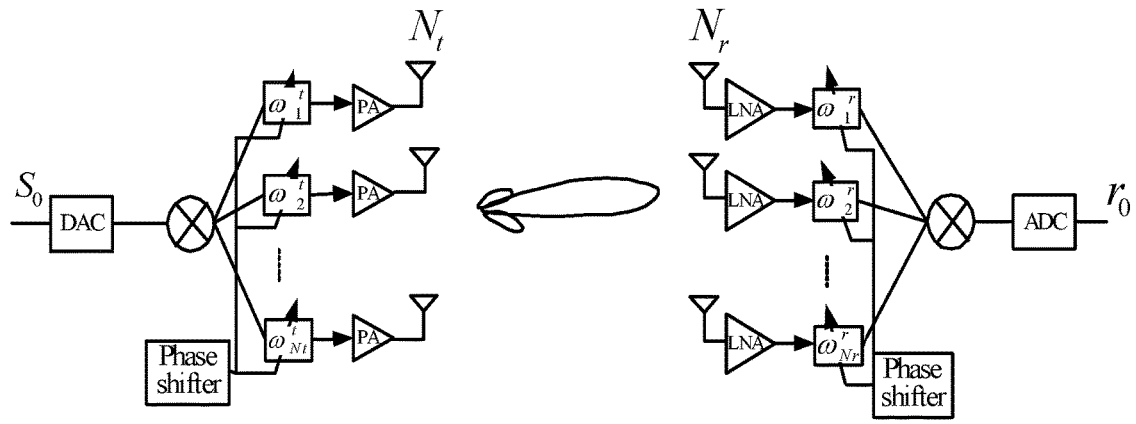
FIG. 2 is a schematic diagram of existing analog beamforming for weighted beamforming of a radio frequency signal.
Figure 3:
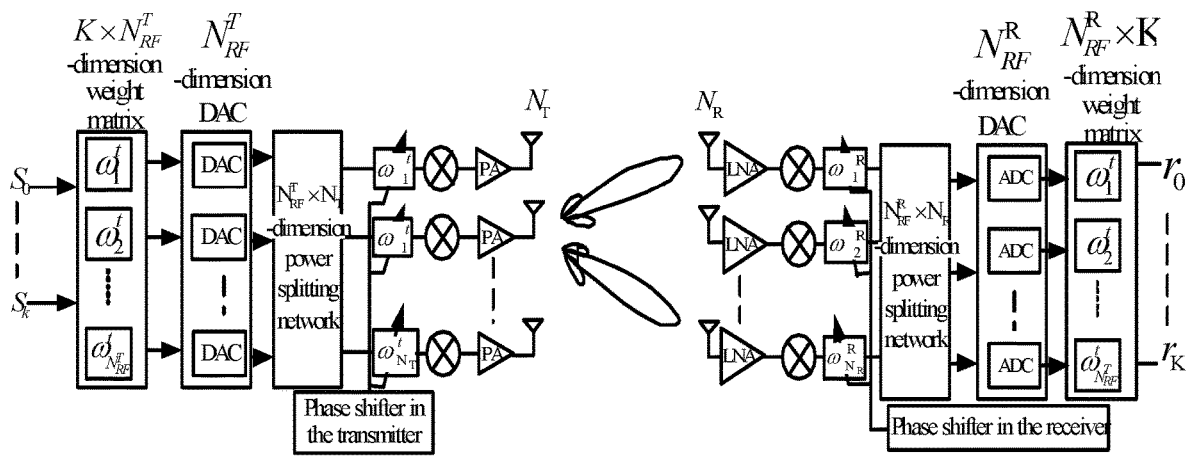
FIG. 3 is a schematic diagram of existing hybrid digital-analog beamforming.
Figure 4:
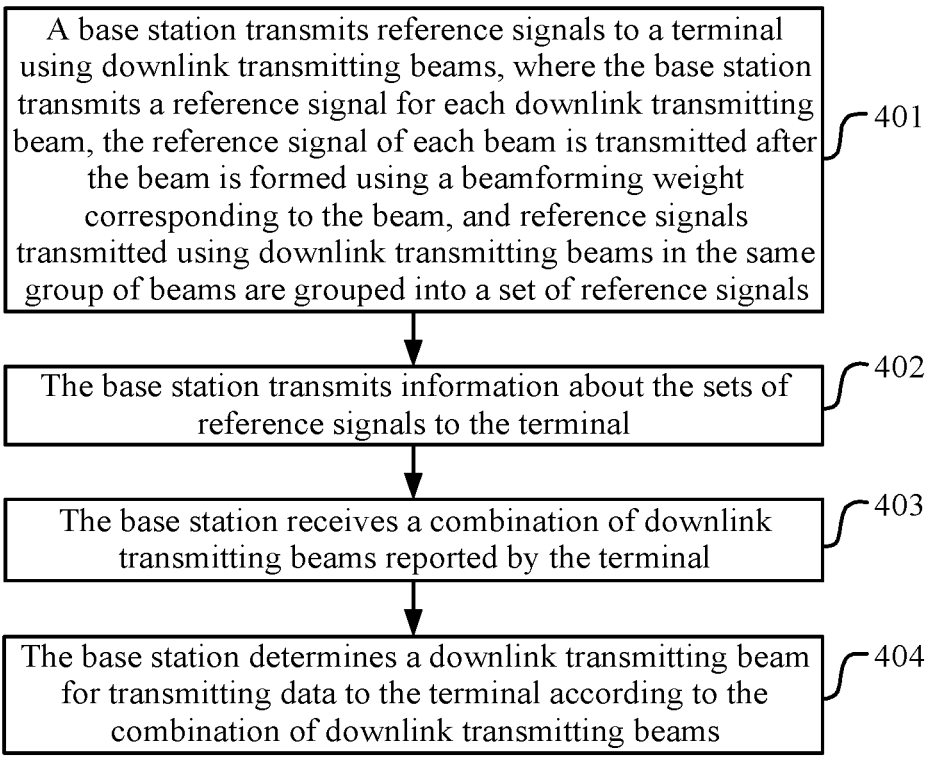
FIG. 4 is a schematic flow chart of a method for obtaining transmitting beam information at the base station's side according to an embodiment of the disclosure.

FIG. 4 is a schematic flow chart of a method for obtaining transmitting beam information at the base station's side according to an embodiment of the disclosure. As illustrated by FIG. 4, the method can include the following operations 401-404.

At the operation 401, a base station transmits reference signals to a terminal using downlink transmitting beams. The base station transmits a reference signal for each downlink transmitting beam. The reference signal of each beam is transmitted after the beam is formed using a beamforming weight corresponding to the beam. Reference signals transmitted by using downlink transmitting beams in a same group of beams are grouped into a set of reference signals.

At the operation 402, the base station transmits information about the sets of reference signals to the terminal.

At the operation 403, the base station receives a combination of downlink transmitting beams reported by the terminal.

At the operation 404, the base station determines a downlink transmitting beam for transmitting data to the terminal according to the combination of downlink transmitting beams.

Figure 5:
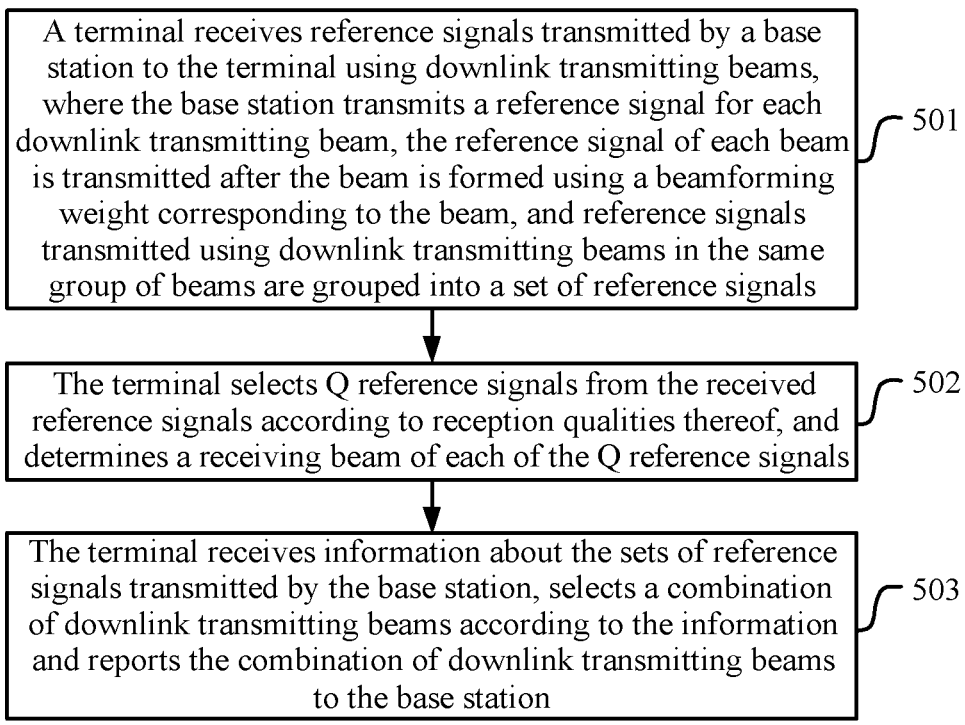
FIG. 5 is a schematic flow chart of a method for feeding back transmitting beam information at the terminal's side according to an embodiment of the disclosure.

FIG. 5 is a schematic flow chart of a method for feeding back beam information at the terminal's side according to an embodiment of the disclosure. As illustrated by FIG. 5, the method may include the following operations 501-503.

At the operation 501, a terminal receives reference signals transmitted by a base station to the terminal using downlink transmitting beams. The base station transmits a reference signal for each downlink transmitting beam. The reference signal of each beam is transmitted after the beam is formed using a beamforming weight corresponding to the beam. Reference signals transmitted using downlink transmitting beams in a same group of beams are grouped into a set of reference signals.

At the operation 502, the terminal selects Q reference signals from the received reference signals according to reception qualities thereof, and determines a receiving beam of each of the Q reference signals. Q is an integer equal to or more than 1.

At the operation 503, the terminal receives information about the sets of reference signals transmitted by the base station, selects a combination of downlink transmitting beams according to the information and reports the combination of downlink transmitting beams to the base station.

An embodiment in which the base station and the terminal cooperate with each other is described below.

Suppose there are $N_T^{BS}$ candidate downlink transmitting beams in total at the base station's side. Each downlink beam corresponds to a group of beamforming weights, and a transmitting beamforming weight of the n-th beam is $W_n = [w_1^n \ w_2^n \ \ldots \ w_K^n]^T$, where K is the number of antenna elements for beamforming, and may be less than the number of antenna elements of the base station. For example, a downlink beam is only transmitted from K antenna elements connected with a transceiver.

At the operation 401, the base station transmits reference signals to the terminal using the downlink transmitting beams. The base station transmits a reference signal for each downlink transmitting beam. The reference signal of each beam is transmitted after the beam is formed using a beamforming weight corresponding to the beam. Reference signals transmitted using downlink transmitting beams in a same group of beams are grouped into a set of reference signals.

In this embodiment, for example, the base station groups the candidate downlink transmitting beams into G groups of beams. G is an integer equal to or more than 1.

A grouping rule is that the base station may transmit signals to the terminal concurrently using downlink transmitting beams in different groups of beams. That is, the base station may transmit the signals to the terminal concurrently at the same time (e.g., in an OFDM symbol) using the downlink transmitting beams in different groups of beams.

Another grouping rule is that the base station may transmit the signals to the terminal concurrently using downlink transmitting beams in the same group of beams.

Or, the base station groups the candidate downlink transmitting beams, and further groups the beams in each group into sub-groups. Downlink transmitting beams in each sub-group may be used to transmit signals concurrently, but downlink transmitting beams in different sub-groups of a same group cannot be used to transmit signals to the terminal concurrently.

Or, downlink transmitting beams in each sub-group cannot be used to transmit signals to the terminal concurrently, whereas downlink transmitting beams in different sub-groups of a same group may be used to transmit signals to the terminal concurrently.

Correspondingly, the system may notify the terminal of information about the grouping rules (including sub-grouping rules).

The base station transmits the downlink reference signals. The base station transmits a reference signal for each candidate downlink transmitting beam. For example, for $N_T^{BS}$ downlink transmitting beams, the base station may transmit $N_T^{BS}$ reference signals. The $N_T^{BS}$ reference signals may be multiplexed by using Time Division Multiplexing (hereinafter "TDM"), Frequency Division Multiplexing (hereinafter "FDM"), Code Division Multiplexing (hereinafter "CDM") mode, or a combination thereof. For example, in a system based on OFDM, the $N_T^{BS}$ reference signals may occupy $N_T^{BS}$ OFDM symbols, where each reference signal occupies one of the OFDM symbols, and the reference signals are multiplexed by using the TDM mode. Or, reference signals of multiple beams may be transmitted in an OFDM symbol, where they are multiplexed by using the FDM or CDM mode.

The reference signal of each beam is transmitted after the beam is formed using the beamforming weight corresponding to the beam.

The reference signal is transmitted periodically or non-periodically.

A reference signal herein may refer to a reference signal transmitted on a transmission occasion, or may refer to a reference signal transmitted on a plurality of transmission occasions.

Each reference signal herein corresponds to one of the downlink transmitting beams.

In an implementation mode, when the base station transmits the reference signals to the terminal concurrently using downlink transmitting beams in different groups of beams, downlink transmitting beams transmitted from the same TRP are a group of beams, and downlink transmitting beams transmitted from a transceiver are a group of beams.

The downlink transmitting beams may be grouped as follows.

Figure 6:
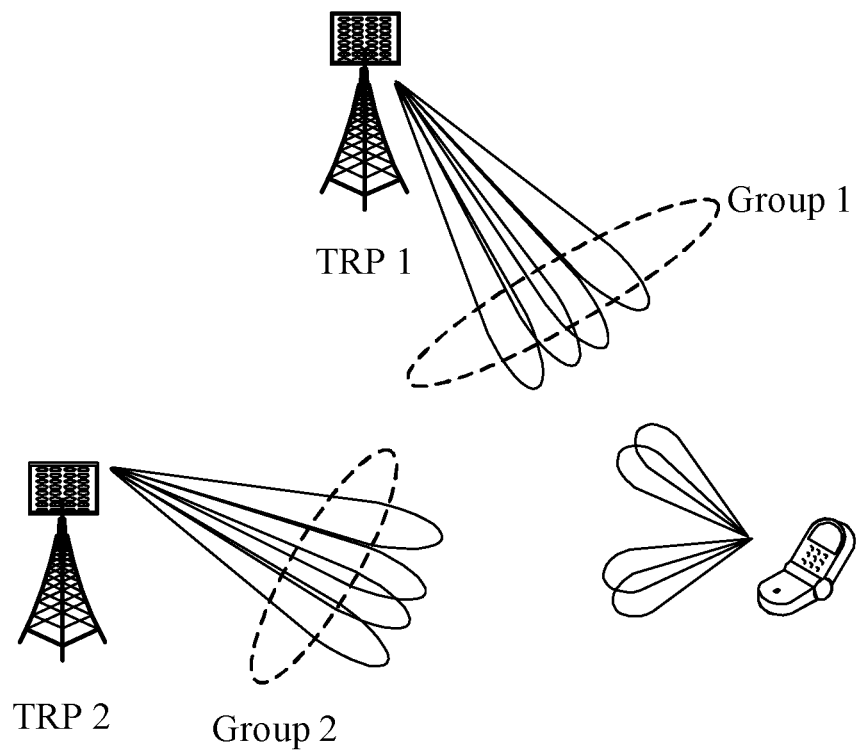
FIG. 6 is a schematic diagram of a first example of groups of beams of a base station according to an embodiment of the disclosure.

A) FIG. 6 is a schematic diagram of a first example of groups of beams of a base station. If a base station includes multiple TRPs, then downlink transmitting beams transmitted from a same TRP may be grouped together. As illustrated by FIG. 6, the base station has two TRPs, i.e., a TRP 1 and a TRP 2, so beams transmitted from the TRP 1 are grouped into a group 1, and beams transmitted from the TRP 2 are grouped into a group 2.

Figure 7:
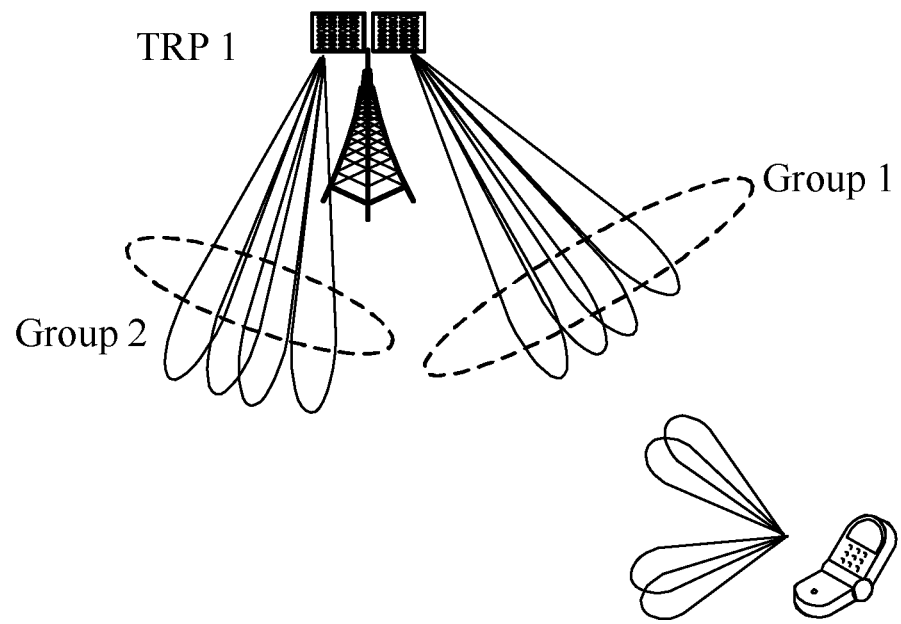
FIG. 7 is a schematic diagram of a second example of groups of beams of a base station according to an embodiment of the disclosure.

B) FIG. 7 is a schematic diagram of a second example of groups of beams of a base station. If an antenna array of a TRP of a base station has multiple transceiver units (e.g., panels), then downlink transmitting beams transmitted from a transceiver unit may be grouped together. As illustrated by FIG. 7, the base station has a TRP having two antenna panels, so beams transmitted from a panel 1 are grouped into a group 1, and beams transmitted from a panel 2 are grouped into a group 2.

It shall be noted that the base station may also transmit the signals to the terminal concurrently using multiple beams in a group of beams.

In some implementation modes, the base station transmits reference signals to the terminal using the downlink transmitting beams, and transmits a reference signal for each downlink transmitting beam in one of the following ways.

The base station maps a reference signal of a downlink transmitting beam onto all ports on all the transmission occasions of a reference signal resource to transmit the reference signal via the ports.

The base station maps a reference signal of a downlink transmitting beam onto all ports on at least one transmission occasion of a reference signal resource to transmit the reference signal via the ports.

The base station maps a reference signal of a downlink transmitting beam onto at least one port on at least one transmission occasion of a reference signal resource to transmit the reference signal via the at least one port.

A reference signal resource includes a plurality of time-frequency resources, e.g., a plurality of Resource Elements (hereinafter "REs") in an OFDM symbol. The reference signal resource may reoccur in the time domain, e.g., it may occur at a specific cycle, or may occur repeatedly in a cycle. Each occurrence of a resource signal resource in the time domain is referred to as a transmission occasion.

Figure 8:
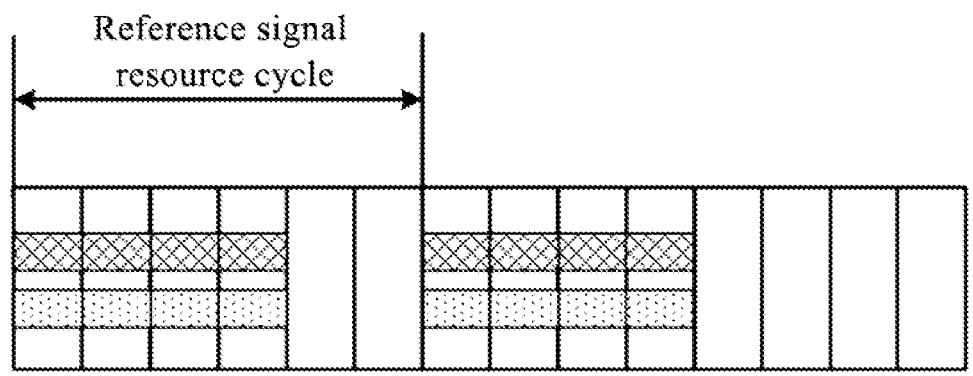
FIG. 8 is a schematic diagram of periodical reference signal resources configuration according to an embodiment of the disclosure.

FIG. 8 is a schematic diagram of periodical reference signal resources configuration according to an embodiment of the disclosure. As illustrated by FIG. 8, the base station configures the terminal with two reference signal resources, where each reference signal resource occurs periodical. Each reference signal resource occurs four times in a cycle, that is, each cycle has four transmission occasions.

Figure 9:
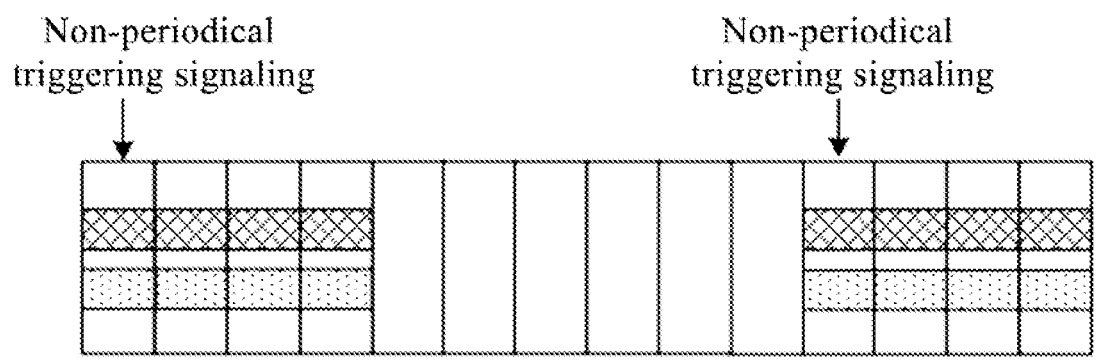
FIG. 9 is a schematic diagram of non-periodical reference signal resources configuration according to an embodiment of the disclosure.

FIG. 9 is a schematic diagram of non-periodical reference signal resources configuration according to an embodiment of the disclosure. As illustrated by FIG. 9, the base station configures the terminal with two reference signal resources, where each reference signal resource is non-periodical and is triggered by non-periodical triggering signaling. In the example illustrated by FIG. 9, each reference signal resource occurs four times after being triggered. That is, four transmission occasions of the reference signal resource are triggered each time.

The reference signals may be mapped and transmitted in the following ways.

A) A reference signal of a downlink transmitting beam is mapped onto all ports on all transmission occasions of a reference signal resource to be transmitted via the ports.

In an implementation mode, a reference signal of a beam is mapped onto all the ports on all the transmission occasions of a reference signal resource (e.g., a Channel State Information-Reference Signal (hereinafter "CSI-RS") resource) to be transmitted via the parts. That is, all the reference signals transmitted over the reference signal resource are transmitted using the same beam.

B) A reference signal of a downlink transmitting beam is mapped onto all ports on at least one transmission occasion of a reference signal resource to be transmitted via the ports.

In an implementation mode, a reference signal of a beam is mapped onto all the ports on one or more transmission occasions of a reference signal resource (e.g., a CSI-RS resource), and is transmitted via the ports. Reference signals of different beams may be transmitted on different transmission occasions of a reference signal resource.

C) A reference signal of a downlink transmitting beam is mapped onto at least one port on at least one transmission occasion of a reference signal resource to be transmitted via the port.

In an implementation mode, a reference signal of a beam is mapped onto one or more ports on one or more transmission occasions of a reference signal resource (e.g., a CSI-RS resource). Reference signals of different beams may be transmitted via different ports on one transmission occasion of a reference signal resource.

The base station may group the downlink reference signals into G sets of reference signals. They are grouped according to the downlink transmitting beams for transmitting the reference signals. That is, reference signals transmitted by downlink transmitting beams in the same group of beams are grouped into a set of reference signals.

Accordingly, the base station may transmit the information about the sets of reference signals to the terminal at the operation 402 in the following ways.

A) When the base station configures the terminal with H sets of reference signal resources, if the h-th set of reference signal resources includes $N_h$ reference signal resources, and a reference signal of a beam is transmitted via all the ports on all the transmission occasions of a reference signal resource, then the base station notifies the terminal of configuration information of the sets of reference signals by notifying the terminal of configuration information of the sets of reference signal resources. Both H and h are integers equal to or more than 1, and h<=H.

In an implementation mode, the base station configures the terminal with H sets of reference signal resources, where the h-th set of reference signal resources includes $N_h$ reference signal resources. A reference signal of a beam is transmitted via all the ports on all the transmission occasions of a reference signal resource. The base station may notify the terminal of the configuration information of the sets of reference signals by notifying the terminal of the configuration information of the sets of reference signal resources.

B) When the base station configures the terminal with F sets of reference signal resources, if the f-th set of reference signal resources includes $N_f$ reference signal resources, each reference signal resource has $N_p$ antenna ports, and a reference signal of a beam is transmitted via an antenna port of each reference signal resource, then the base station may notify the terminal of the configuration information of the sets of reference signals by notifying the terminal of both the configuration information of the sets of reference signal resources and the antenna ports. Both F and f are integers equal to or more than 1, and f<=F.

In an implementation mode, the base station configures the terminal with F sets of reference signal resources, where the f-th set of reference signal resources includes $N_f$ reference signal resources. Each reference resource has $N_p$ antenna ports, and a reference signal of a beam is transmitted via an antenna port of each reference signal resource. Then the base station may notify the terminal of the configuration information of the sets of reference signals by notifying the terminal of both the configuration information of the sets of reference signal resources and the antenna ports.

Accordingly, at the terminal's side, at the operation 501, the terminal receives the reference signals transmitted by the base station using the downlink transmitting beams, where the base station transmits a reference signal for each downlink transmitting beam, the reference signal of each beam is transmitted after the beam is formed using a beamforming weight corresponding to the beam, and reference signals transmitted using downlink transmitting beams in the same group of beams are grouped into a set of reference signals.

At the operation 502, the terminal selects Q reference signals from the received reference signals according to reception qualities thereof. In an implementation mode, the terminal receives the reference signals transmitted by the base station, and selects Q reference signals from the $N_T^{BS}$ reference signals.

The base station receives the reference signals transmitted by the base station, determines the reception qualities of the $N_T^{BS}$ reference signals by measuring the reference signals, and determines a receiving beam for receiving each reference signal.

The reception quality of each reference signal may be characterized by Reference Signal Received Power (hereinafter "RSRP"), or may be characterized by another kind of measurement result. The terminal selects the reference signals according to reception qualities thereof. For example, the terminal selects Q reference signals having the highest reception qualities, or Q reference signals whose reception qualities is higher than a certain threshold.

Suppose the terminal has $N_R^{UE}$ receiving beams in total, and each receiving beam corresponds to a group of beamforming weights. Then the receiving beam of each reference signal may be determined at the operation 502 in the following way: for a reference signal, the terminal attempts to receive the reference signal by using each receiving beam, respectively, and selects the receiving beam having the highest received signal power as the receiving beam of the reference signal.

In an implementation mode, for a reference signal, the terminal determines a receiving beam for receiving the reference signal.

The receiving beams of the terminal can be selected from candidate receiving beams. For example, the terminal has $N_R^{UE}$ receiving beams in total, each receiving beam corresponds to a group of beamforming weights, and the group of receive beamforming weights of the n-th beam is $V_n=[v_1^n\ v_2^n \ldots v_L^n]^T$, where L is the number of antenna elements for beamforming, and may be less than the number of antenna elements of the terminal. For example, signals received by L antenna elements are weighted by using their beamforming weights and then summed to be transmitted to a transceiver unit.

For a reference signal, the terminal can receive the reference signal by using each receiving beam, respectively, and select the receiving beam having the highest received signal power as the receiving beam of the reference signal.

At the operation 503, the terminal selects a combination of downlink transmitting beams according to the information about the sets of reference signals, where the combination of downlink transmitting beams selected by the terminal is a combination of downlink transmitting beams recommended by the terminal for the base station to use.

In an implementation mode, the terminal selects a combination of downlink transmitting beams (represented by reference signals) to be recommended by the terminal for the base station to use according to the information about the sets of reference signals to determine groups of reference signals.

The terminal may also receive signals by using the recommended combination of downlink transmitting beams, where the base station's side groups the reference signals into the sets of reference signals, and the terminal's side groups the reference signals into the groups of reference signals according to their measurement results.

Suppose that the transceiver units of the terminal can be grouped into R groups (R is an integer equal to or more than 1), where each group includes at least one transceiver unit, and the at least one transceiver unit in each group is connected with a plurality of antenna elements. The transceiver units in different groups of transceiver units may perform beamforming on their received signals separately, and transmit them to a baseband processing unit for subsequent calculation.

The terminal may receive beams from at least R different directions using R transceiver units, respectively, so the combination of downlink transmitting beams the terminal recommends may include R downlink transmitting beams, or less than or more than R downlink transmitting beams.

At the operation 503, reference signals of different beams in the combination of downlink transmitting beams may belong to different sets of reference signals.

In an implementation mode, the reference signals of different beams in the combination of downlink transmitting beams recommended by the terminal belong to different sets of reference signals.

At the operation 503, the terminal may select the combination of downlink transmitting beams, that is, it may determine the groups of reference signals by adopting one of the following approaches.

In a first approach, the terminal selects reference signals belonging to a same set of reference signals among the Q (Q is an integer equal to or more than 1) reference signals as a group of reference signals, and a combination of the downlink transmitting beams corresponding to the reference signals in different groups of reference signals are the combination of downlink transmitting beams selected by the terminals.

In an implementation mode, the reference signals belonging to the same set of reference signals among the Q reference signals constitute a group of reference signals, and the downlink transmitting beams represented by the reference signals in different groups of reference signals can be used concurrently.

Figure 10:
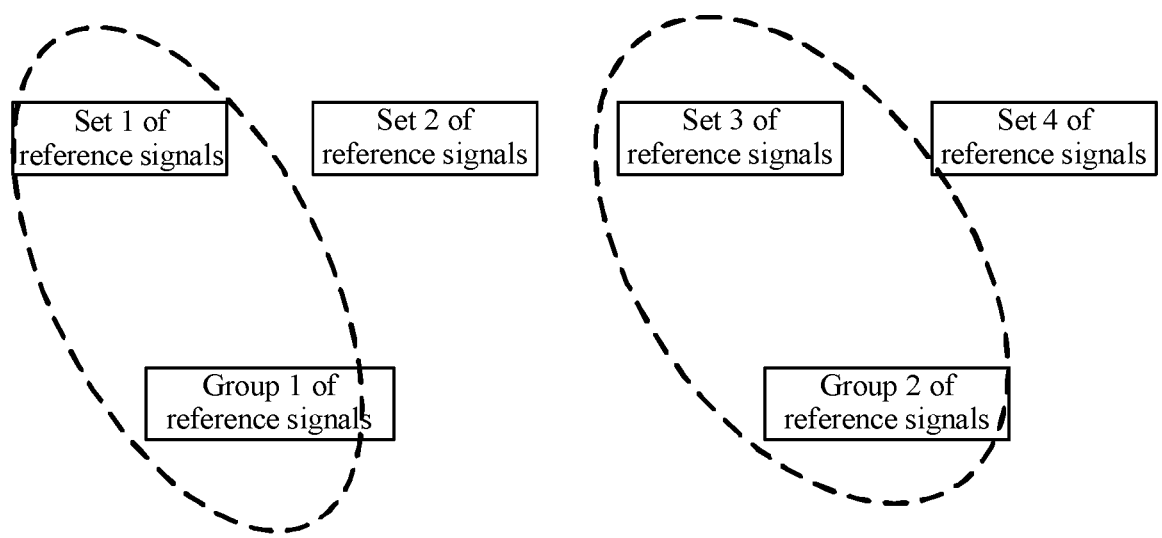
FIG. 10 is a schematic diagram of a first example of reference signal configuration according to an embodiment of the disclosure.

FIG. 10 is a schematic diagram of a first example of reference signal configuration. As illustrated by FIG. 10, the reference signals transmitted by the base station belong to four sets of reference signals. Reference signals selected by the terminal are grouped into two groups of reference signals, where the reference signals in the first group of reference signals belong to the first set of reference signals, and the reference signals in the second group of reference signals belong to the third set of reference signals.

In a second approach, the terminal selects reference signals belonging to a plurality of sets of reference signals among the Q reference signals as a group of reference signals, and the downlink transmitting beams corresponding to the reference signals in different groups of reference signals constitute the combination of downlink transmitting beams.

In practice, the reference signals belonging to a plurality of sets of reference signals among the Q reference signals are a group of reference signals. Then the downlink transmitting beams corresponding to the reference signals in different groups of reference signals may be used concurrently.

In the first approach and the second approach, any two reference signals belonging to different groups of reference signals shall belong to different sets of reference signals.

Figure 11:
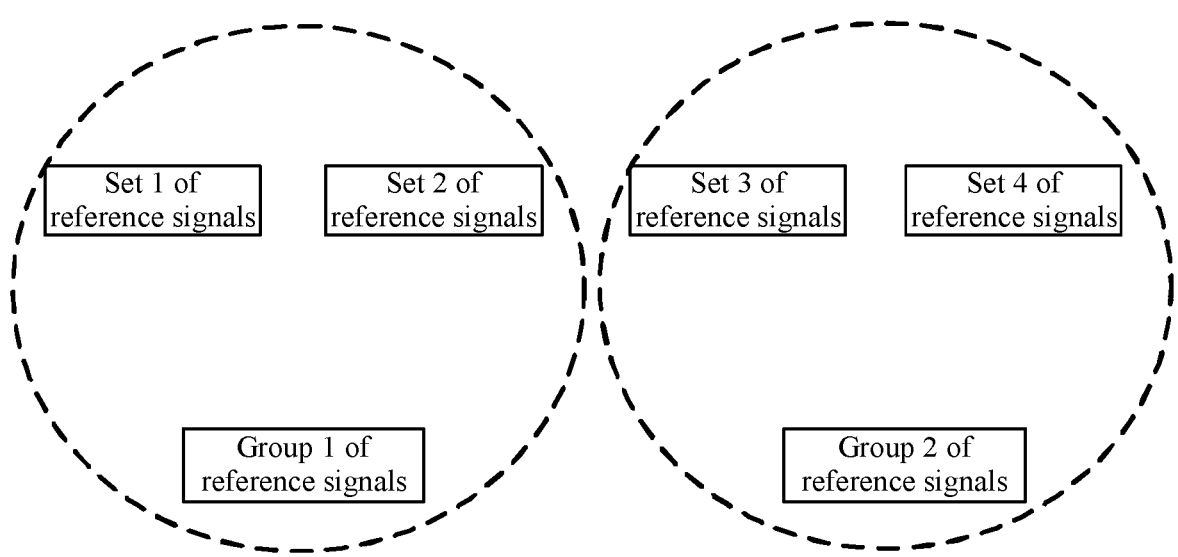
FIG. 11 is a schematic diagram of a second example of reference signal configuration according to an embodiment of the disclosure.

FIG. 11 is a schematic diagram of a second example of reference signal configuration. As illustrated by FIG. 11, the reference signals transmitted by the base station belong to four sets of reference signals. Reference signals selected by the terminal are grouped into two groups of reference signals, where the reference signals in the first group of reference signals belong to the first set of reference signals and the second set of reference signals, and the reference signals in the second group of reference signals belong to the third set of reference signals and the fourth set of reference signals.

In a third approach, the terminal selects reference signals belonging to different sets of reference signals among the Q reference signals as a group of reference signals, any two reference signals in a same group of reference signals do not belong to a same set of reference signals, and a combination of downlink transmitting beams corresponding to reference signals in a same group of reference signals is the selected combination of downlink transmitting beams.

In practice, the terminal selects reference signals belonging to different sets of reference signals among the Q reference signals as a group of reference signals. Any two reference signals in the same group of reference signals do not belong to the same set of reference signals. Then the downlink transmitting beams represented the reference signals in the same group of reference signals can be used concurrently.

Figure 12:
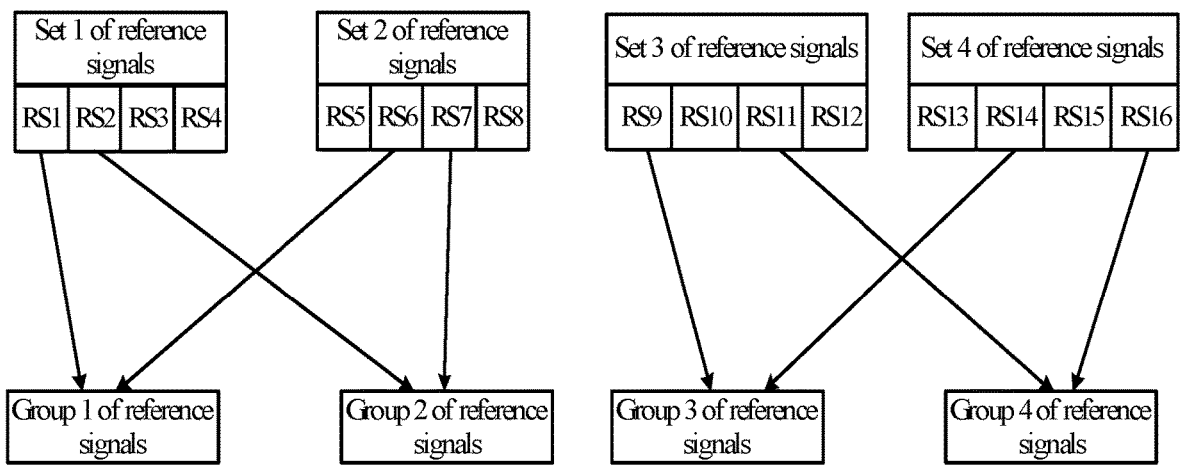
FIG. 12 is a schematic diagram of a third example of reference signal configuration according to an embodiment of the disclosure.

FIG. 12 is a schematic diagram of a third example of reference signals. As illustrated by FIG. 12, the reference signals transmitted by the base station belong to four sets of reference signals, and the terminal has two groups of transceiver units. Reference signals selected by the terminal are grouped into four groups of reference signals. The reference signals in the first group of reference signals include one of the reference signals in the first set of reference signals (i.e., RS1), and one of the reference signals in the second set of reference signals (i.e., RS6). The reference signals in the second group of reference signals include one of the reference signals in the first set of reference signals (i.e., RS2), and one of the reference signals in the second set of reference signals (i.e., RS7). The reference signals in the third group of reference signals include one of the reference signals in the third set of reference signals (i.e., RS9), and one of the reference signals in the fourth set of reference signals (i.e., RS14). The reference signals in the fourth group of reference signals include one of the reference signals in the third set of reference signals (i.e., RS11), and one of the reference signals in the fourth set of reference signals (i.e., RS16).

Figure 13:
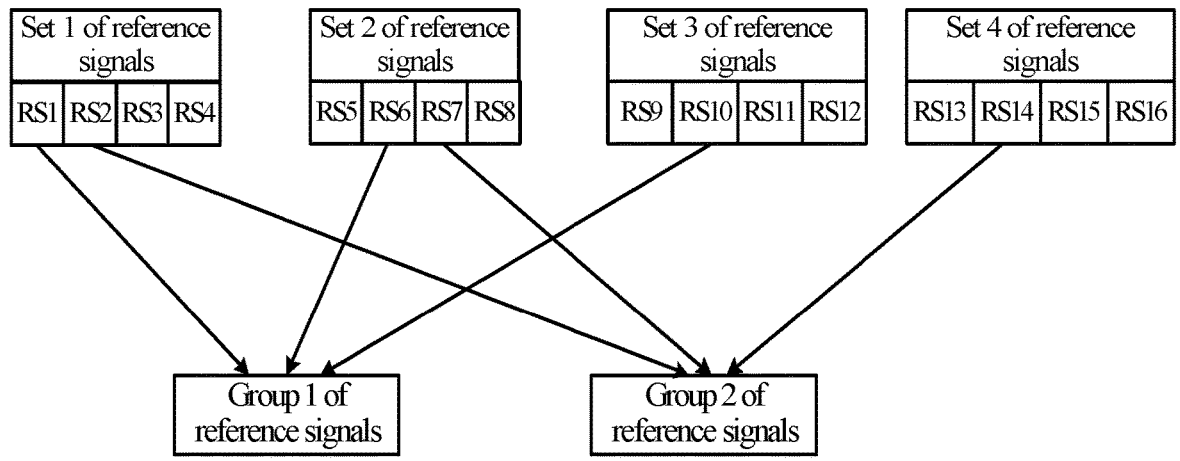
FIG. 13 is a schematic diagram of a fourth example of reference signal configuration according to an embodiment of the disclosure.

FIG. 13 is a schematic diagram of a fourth example of reference signal configuration. As illustrated by FIG. 13, the reference signals transmitted by the base station belong to four sets of reference signals, and the terminal has two groups of transceiver units. Reference signals selected by the terminal are grouped into two groups of reference signals.

The reference signals in the first group of reference signals include one of the reference signals in the first set of reference signals (RS1), one of the reference signals in the second set of reference signals (RS6), and one of the reference signals in the third set of reference signals (RS10). The reference signals in the second group of reference signals include one of the reference signals in the first set of reference signals (RS2), one of the reference signals in the second set of reference signals (RS7), and one of the reference signals in the fourth set of reference signals (RS14).

In practice, the base station may select one of the three approaches and notify the terminal of the selected base station, or the terminal may select one of the three approaches. If one of the approaches is selected by the terminal, then the information reported by the terminal may further include indication information of the selected grouping approach. If one of the approaches is selected by the base station, then the base station may send the indication information of the selected grouping approach to the terminal.

At the operation 503, when terminal selects the combination of downlink transmitting beams and report the selected combination to the base station, what is reported is identification information of the Q reference signals selected by the terminal and information about the groups of reference signals including the Q reference signals.

According to an implementation mode, the terminal reports the identification information of the selected Q reference signals and the information about the groups of reference signals including the Q reference signals. The identification information of the reference signals may be resource indexes, sequence indexes, time indexes, port indexes, or combinations thereof.

For each reference signal, the reported information can be in the form of the following triplet: {reference signal identifier, reference signal reception quality, reference signal group identifier}.

The reference signal identifier can be an identifier, e.g., a serial number, of the reference signal selected by the terminal in the $N_T^{BS}$ reference signals transmitted by the base station. The reference signal reception quality can be RSRP or another indicator. The reference signal group identifier is defined as follows: the terminal groups the reference signal into L groups, for example, and the L groups of reference signals can be identified as 1, 2, . . . , L, respectively, so the reported information includes the identifier of the group of reference signals including the selected reference signal.

It shall be noted that a reference signal may belong to a plurality of different groups of reference signals, and when the reference signal belongs to different groups of reference signals, the reception quality of the reference signals may be different.

Accordingly, after the information is reported, at the operation 403, when the base station receives the combination of downlink transmitting beams reported by the terminal, the base station actually receives the identification information of the Q reference signals selected by the terminal and information about the groups of reference signals including the Q reference signals.

According to an implementation mode, the method may further include: reporting, by the terminal, an overall reception quality of the groups of reference signals to the base station.

Accordingly, the method at the base station's side may further include: receiving, by the base station, the overall reception quality of groups of reference signals reported by the terminal.

In practice, the terminal may further report an overall reception quality of a group of reference signals. E.g., an average of reception qualities of all the reference signals in the group of reference signals, or, a predicated throughput, a predicated channel capacity, etc., of data transmission to the terminal using the beams represented by all the reference signals in the group of reference signals.

Accordingly, after the information is reported, at the operation 404, if the base station receives information about the groups of reference signals sent by the base station, then the base station determines the downlink transmitting beams for transmitting data to the terminal according to the combination of downlink transmitting beams by adopting one of the following approaches.

1) If two reference signals belong to a same group of reference signals, then the downlink transmitting beams of these two reference signals can be used concurrently, where downlink transmitting beams corresponding to reference signals in the same group of reference signals constitute the combination of downlink transmitting beams.

2) If two reference signals belong to different groups of reference signals, then the downlink transmitting beams of these two reference signals can be used concurrently, where downlink transmitting beams corresponding to reference signals in different groups of reference signals constitute the combination of downlink transmitting beams.

In practice, the base station receives identification information of the Q reference signals and information about the groups of reference signals including the Q reference signals, reported by the terminal.

The terminal may determine which downlink transmitting beams can be used to transmit data to the terminal concurrently according to the received information in one of the following ways dependent upon the approach adopted at the operation 503.

1. If two reference signals belong to the same group of reference signals, then the downlink transmitting beams of these two reference signals can be used concurrently.

2. If two reference signals belong to different groups of reference signals, then the downlink transmitting beams of these two reference signals can be used concurrently.

The base station selects a transmission mode according to the determination result. For example, the base station may transmit multiple parallel data streams concurrently using multiple downlink transmitting beams in a space division multiplexing mode, or may transmit a data stream using multiple downlink transmitting beams concurrently in a spatial diversity mode.

Based upon the same inventive conception, embodiments of the disclosure further provide a device for obtaining transmitting beam information and a device for transmitting beam information. Since these devices address the problem under a similar principle to the method for obtaining transmitting beam information and the method for transmitting beam information, reference can be made to the embodiments of the methods for implementations of these devices, and a repeated description thereof is omitted herein.

Figure 14:
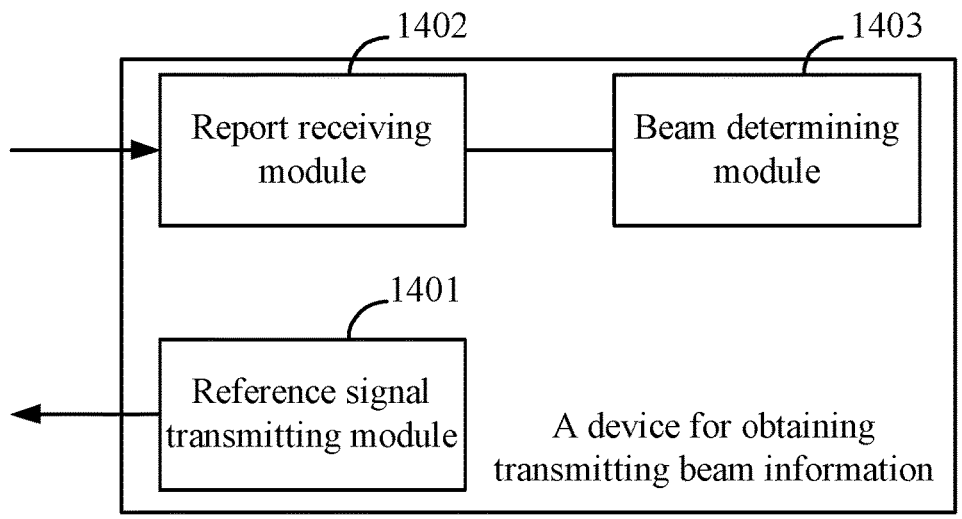
FIG. 14 is a schematic structural diagram of a device for obtaining transmitting beam information at the base station's side according to an embodiment of the disclosure.

FIG. 14 is a schematic structural diagram of a device for obtaining transmitting beam information at the base station's side according to an embodiment of the disclosure. As illustrated by FIG. 14, the device can include a reference signal transmitting module 1401, a report receiving module 1402 and a beam determining module 1403.

The reference signal transmitting module 1401 is configured to transmit reference signals to a terminal using downlink transmitting beams and transmit information about sets of the reference signals to the terminal. The reference signal transmitting module 1401 transmits one of the reference signals for each of the downlink transmitting beams. The reference signal of each of the downlink transmitting beams is transmitted after the downlink transmitting beam is formed using a beamforming weight corresponding to the downlink transmitting beam. Reference signals transmitted using downlink transmitting beams in a same group of downlink transmitting beams are grouped into one of the sets of reference signals.

The report receiving module 1402 is configured to receive a combination of downlink transmitting beams reported by the terminal.

The beam determining module 1403 is configured to determine a downlink transmitting beam for transmitting data to the terminal, according to the combination of downlink transmitting beams.

According to an implementation mode of the embodiment of the disclosure, when the reference signal transmitting module is further configured to transmit the reference signals to the terminal using the downlink transmitting beams in different groups of beams concurrently, downlink transmitting beams transmitted from a same TRP are a group of beams; or, downlink transmitting beams transmitted from a transceiver unit are a group of beams.

According to an implementation mode of the embodiment of the disclosure, the reference signal transmitting module is further configured to transmit one of the reference signals for each of the downlink transmitting beams by mapping the reference signal of one of the downlink transmitting beams onto all ports on all transmission occasions of a reference signal source, and transmitting the reference signal via the ports. Or, the reference signal transmitting module is further configured to transmit one of the reference signals for each of the downlink transmitting beams by mapping the reference signal of one of the downlink transmitting beams onto all ports on at least one transmission occasion of a reference signal source, and transmitting the reference signal via the ports. Or, the reference signal transmitting module is further configured to transmit one of the reference signals for each of the downlink transmitting beams by mapping the reference signal of one of the downlink transmitting beams onto at least one port on at least one transmission occasion of a reference signal source, and transmitting the reference signal via the port.

According to an implementation mode of the embodiment of the disclosure, the reference signal transmitting module is further configured to notify the terminal of configuration information of the sets of reference signals by notifying the terminal of configuration information of sets of reference signal resources when the terminal is configured with H sets of reference signal resources, an h-th set of the H sets includes $N_h$ reference signal resources, and the reference signal of one of the downlink transmitting beams is transmitted via all ports on all transmission occasions of one of the reference signal resources. Both H and h are integers equal to or more than 1, and h<=H. Or, the reference signal transmitting module is further configured to notify the terminal of the configuration information of the sets of reference signals by notifying the terminal of the configuration information of the sets of reference signal resources and of antenna ports when the terminal is configured with F sets of reference signal resources, an f-th set of the F sets includes $N_f$ reference signal resources, each of the reference signal resources has $N_p$ antenna ports, and the reference signal of one of the downlink transmitting beams is transmitted via one of the antenna ports of each of the reference signal resources. Both F and f are integers equal to or more than 1, and f<=F.

According to an implementation mode of the embodiment of the disclosure, the report receiving module is configured to receive identification information of Q reference signals selected by the terminal from the transmitted reference signals and information about groups of reference signals including the Q reference signals when receiving the combination of downlink transmission beams reported by the terminal.

According to an implementation mode of the embodiment of the disclosure, the beam determining module is further configured to determine the downlink transmitting beam for transmitting data to the terminal, according to the combination of downlink transmitting beams upon reception of information about groups of reference signals transmitted by the terminal by determining that the downlink transmitting beams of two of the reference signals can be transmitted concurrently when the two reference signals belong to a same group of reference signals. The downlink transmitting beams corresponding to the reference signals in the same group of reference signals constitute the combination of downlink transmitting beams.

Or, the beam determining module is further configured to determine the downlink transmitting beam for transmitting data to the terminal, according to the combination of downlink transmitting beams upon reception of information about groups of reference signals transmitted by the terminal by determining that the downlink transmitting beam of two of the reference signals can be transmitted concurrently when the two reference signals belong to different groups of reference signals. The downlink transmitting beams corresponding to the reference signals in different groups of reference signals constitute the combination of downlink transmitting beams.

According to an implementation mode of the embodiment of the disclosure, the report receiving module is further configured to receive an overall reception quality of groups of reference signals reported by the terminal.

Figure 15:
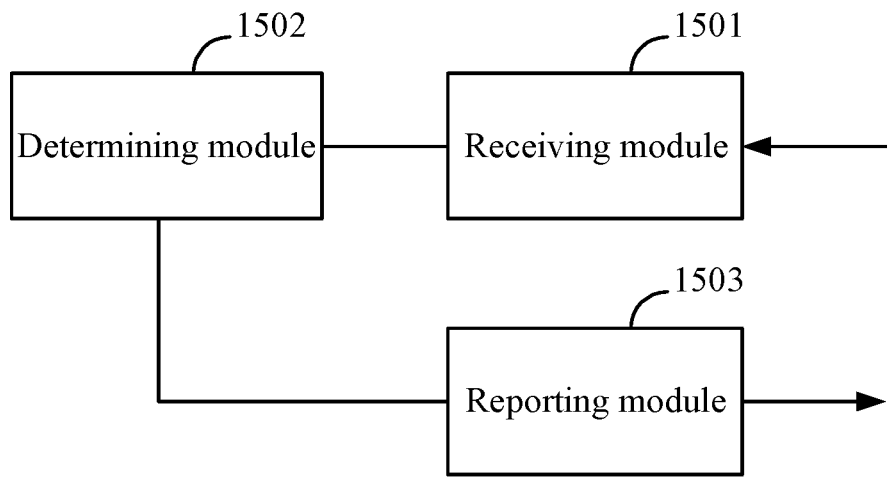
FIG. 15 is a schematic structural diagram of a device for feeding back transmitting beam information at the terminal's side according to an embodiment of the disclosure.

FIG. 15 is a schematic structural diagram of a device for feeding back transmitting beam information at the terminal's side. As illustrated by FIG. 15, the device can include a receiving module 1501, a determining module 1502 and a reporting module 1503.

The receiving module 1501 is configured to receive reference signals transmitted by a base station using downlink transmitting beams and receive information about sets of the reference signals transmitted by the base station. The base station transmits one of the reference signals for each of the downlink transmitting beams. The reference signal of each of the downlink transmitting beams is transmitted after the downlink transmitting beam is formed using a beamforming weight corresponding to the downlink transmitting beam. Reference signals transmitted using downlink transmitting beams in a same group of beams are grouped into one of the sets of reference signals.

The determining module 1502 is configured to select Q reference signals from the received reference signals according to reception qualities thereof and determine a receiving beam of each of the Q reference signals.

The reporting module 1503 is configured to select a combination of downlink transmitting beams according to the information about the sets of reference signals and report the combination of downlink transmitting beams to the base station.

According to an implementation mode of the embodiment of the disclosure, assuming that the terminal has $N_R^{UE}$ receiving beams in total, each of the receiving beams corresponds to a group of beamforming weights. When the determining module is configured to determine the receiving beam of each of the Q reference signals, the determining module is configured to: for each of the Q reference signals, receive the reference signal using each of the receiving beams, respectively, and select the receiving beam having a highest received signal power as the receiving beam of the reference signal.

According to an implementation mode of the embodiment of the disclosure, reference signals of different downlink transmitting beams in the combination of downlink transmitting beams belong to different sets of reference signals.

According to an implementation mode of the embodiment of the disclosure, when the reporting module is configured to select the combination of downlink transmitting beams, the reporting module is configured to: select reference signals belonging to a same set of reference signals among the Q reference signals as a group of reference signals, and determine downlink transmitting beams corresponding to reference signals in different groups of reference signals as the combination of downlink transmitting beams; or select reference signals belonging to a plurality of sets of reference signals among the Q reference signals as a group of reference signals, and determine downlink transmitting beams corresponding to reference signals in different groups of reference signals as the combination of downlink transmitting beams; or select reference signals belonging to different sets of reference signals among the Q reference signals as a group of reference signals, where any two reference signals in the same group of reference signals do not belong to a same set of reference signals, and determine a combination of downlink transmitting beams corresponding to reference signals in the same group of reference signals as the combination of downlink transmitting beams.

According to an implementation mode of the embodiment of the disclosure, when the reporting module is configured to select and report the combination of downlink transmitting beams to the base station, the reporting module is configured to report identification information of the selected Q reference signals, and information about groups of reference signals including the Q reference signals.

According to an implementation mode of the embodiment of the disclosure, the reporting module is further configured to report an overall reception quality of groups of reference signals to the base station.

For the convenience of description, different parts of the devices above have been described as modules or units according to their functionality. Of course, the functionality of the modules or units may be implemented by one or more pieces of software or hardware according to the embodiments of the disclosure.

The technical solutions according to the embodiments of the disclosure can be embodied as follows.

Figure 16:
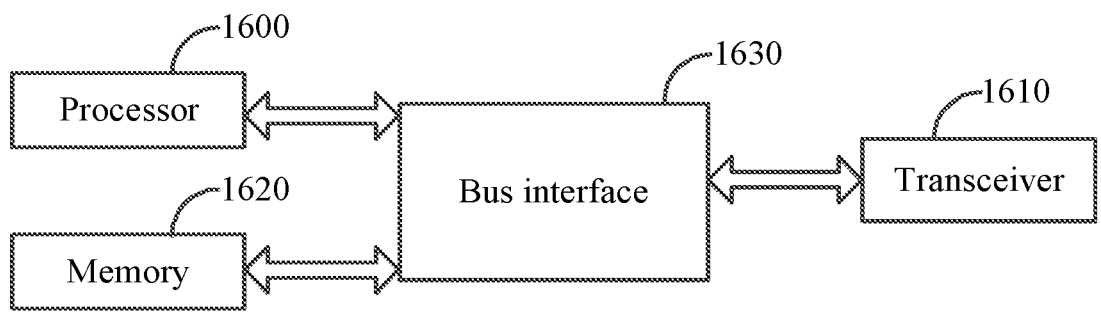
FIG. 16 is a schematic structural diagram of a base station according to an embodiment of the disclosure.

FIG. 16 is a schematic structural diagram of a base station according to an embodiment of the disclosure. As illustrated by FIG. 16, the base station includes a processor 1600, a transceiver 1610 and a memory 1620.

The processor 1600 is configured to read a program in the memory 1620 to determine a downlink transmitting beam for transmitting data to a terminal, according to a combination of downlink transmitting beams.

The transceiver 1610 is configured to transmit and receive data under the control of the processor 1600 and to: transmit reference signals to the terminal using downlink transmitting beams: transmit information about sets of the reference signals to the terminal; and receive the combination of downlink transmitting beams reported by the terminal. One of the reference signals is transmitted for each of the downlink transmitting beams. The reference signal of each of the downlink transmitting beams is transmitted after the downlink transmitting beam is formed using a beamforming weight corresponding to the downlink transmitting beam. Reference signals transmitted using downlink transmitting beams in a same group of downlink transmitting beams are grouped into one of the sets of reference signals.

According to an implementation mode of the embodiment of the disclosure, the processor is further configured to read the program in the memory to control the transceiver to transmit the reference signals to the terminal using the downlink transmitting beams in different groups of beams concurrently, where downlink transmitting beams transmitted from a same TRP are a group of beams; or, downlink transmitting beams transmitted from a transceiver unit are a group of beams.

According to an implementation mode of the embodiment of the disclosure, the processor is further configured to read the program in the memory to control the transceiver to transmit the reference signals to the terminal using the downlink transmitting beams by: mapping the reference signal of one of the downlink transmitting beams onto all ports on all transmission occasions of a reference signal source, and controlling the transceiver to transmit the reference signal via the ports. Or, the processor is further configured to read the program in the memory to control the transceiver to transmit the reference signals to the terminal using the downlink transmitting beams by: mapping the reference signal of one of the downlink transmitting beams onto all ports on at least one transmission occasion of a reference signal source, and controlling the transceiver to transmit the reference signal via the ports. Or, the processor is further configured to read the program in the memory to control the transceiver to transmit the reference signals to the terminal using the downlink transmitting beams by: mapping the reference signal of one of the downlink transmitting beams onto at least one port on at least one transmission occasion of a reference signal source, and controlling the transceiver to transmit the reference signal via the port.

According to an implementation mode of the embodiment of the disclosure, the processor is further configured to read the program in the memory to control the transmitter to transmit the information about the sets of reference signals to the terminal by: notifying the terminal of configuration information of the sets of reference signals by notifying the terminal of configuration information of sets of reference signal resources when the base station configures the terminal with H sets of reference signal resources, an h-th set of the H sets includes $N_h$ reference signal resources, and the reference signal of one of the downlink transmitting beams is transmitted via all ports on all transmission occasions of one of the reference signal resources. Or, the processor is further configured to read the program in the memory to transmit, via the transceiver, the information about the sets of reference signals to the terminal by: notifying the terminal of the configuration information of the sets of reference signals by notifying the terminal of the configuration information of the sets of reference signal resources and of antenna ports when the base station configures the terminal with F sets of reference signal resources, an f-th set of the F sets includes $N_f$ reference signal resources, each of the reference signal resources has $N_p$ antenna ports, and the reference signal of one of the downlink transmitting beams is transmitted via one of the antenna ports of each of the reference signal resources.

According to an implementation mode of the embodiment of the disclosure, the combination of downlink transmitting beams received by the base station is identification information of Q reference signals selected by the terminal from the transmitted reference signals and information about groups of reference signals including the Q reference signals.

According to an implementation mode of the embodiment of the disclosure, the processor is further configured to read the program in the memory to receive information about groups of reference signals transmitted by the terminal. The processor is further configured to read the program in the memory to determine the downlink transmitting beam for transmitting data to the terminal, according to the combination of downlink transmitting beams by: determining that the downlink transmitting beams of two of the reference signals can be transmitted concurrently when the two reference signals belong to a same group of reference signals, where the downlink transmitting beams corresponding to the reference signals in the same group of reference signals constitute the combination of downlink transmitting beams; or, determining that the downlink transmitting beam of two of the reference signals can be transmitted concurrently when the two reference signals belong to different groups of reference signals, where the downlink transmitting beams corresponding to the reference signals in different groups of reference signals constitute the combination of downlink transmitting beams.

According to an implementation mode of the embodiment of the disclosure, the processor is further configured to read the program in the memory to receive an overall reception quality of groups of reference signals reported by the terminal.

In FIG. 16, the bus architecture can include any number of interconnecting buses and bridges to link together various circuits including one or more processors represented by the processor 1600, and one or more memories represented by the memory 1620. The bus architecture can further link together various other circuits, e.g., a peripheral device, a manostat, a power management circuit, etc., all of which are well known in the art, so a further description thereof is omitted in this context. The bus interface 1630 serves as an interface. The transceiver 1610 can be a number of elements, e.g., a transmitter and a receiver, which are units for communication with various other devices over a transmission medium. The processor 1600 is responsible for managing the bus architecture and performing normal processes, and the memory 1620 can store data for use by the processor 1600 when performing the operations.

Figure 17:
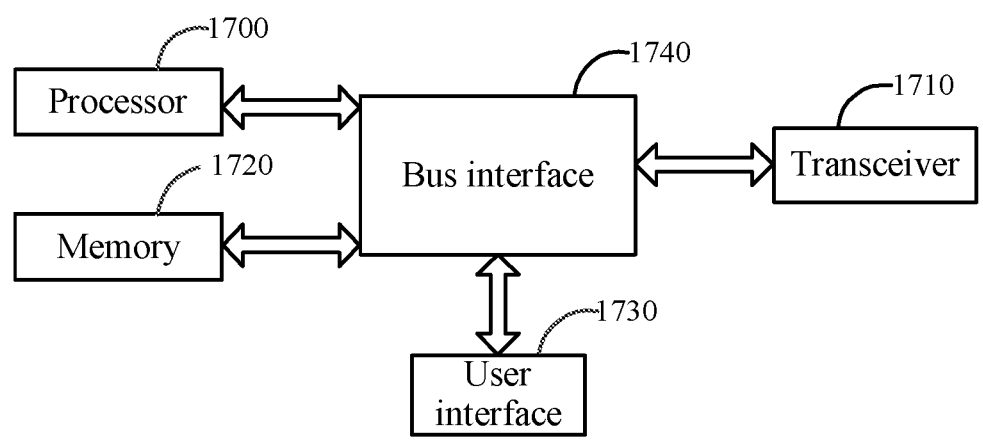
FIG. 17 is a schematic structural diagram of a terminal according to an embodiment of the disclosure.

FIG. 17 is a schematic structural diagram of a terminal according to an embodiment of the disclosure. As illustrated, the terminal includes a processor 1700, a transceiver 1710 and a memory 1720.

The processor 1700 is configured to read a program in the memory 1720 perform the following operations: selecting Q reference signals from received reference signals according to reception qualities thereof: determining a receiving beam of each of the Q reference signals; and selecting a combination of downlink transmitting beams according to information about sets of the reference signals.

The transceiver 1710 is configured to transmit and receive data under the control of the processor 1700 to perform the following operations: receiving reference signals transmitted by a base station using downlink transmitting beams, receiving the information about the sets of reference signals transmitted by the base station; and reporting the combination of downlink transmitting beams to the base station. The base station transmits one of the reference signals for each of the downlink transmitting beams. The reference signal of each of the downlink transmitting beams is transmitted after the downlink transmitting beam is formed using a beamforming weight corresponding to the downlink transmitting beam. Reference signals transmitted using downlink transmitting beams in a same group of beams are grouped into one of the sets of reference signals.

According to an implementation mode of the embodiment of the disclosure, assuming that the terminal has $N_R^{UE}$ receiving beams in total and each of the receiving beams corresponds to a group of beamforming weights. Determining the receiving beam of each of the Q reference signals includes: for each of the Q reference signals, receiving, by the terminal, the reference signal using each of the receiving beams, respectively, and selecting the receiving beam having a highest received signal power as the receiving beam of the reference signal.

According to an implementation mode of the embodiment of the disclosure, reference signals of different downlink transmitting beams in the combination of downlink transmitting beams belong to different sets of reference signals.

According to an implementation mode of the embodiment of the disclosure, selecting the combination of downlink transmitting beams includes: selecting reference signals belonging to a same set of reference signals among the Q reference signals as a group of reference signals, and determining downlink transmitting beams corresponding to reference signals in different groups of reference signals as the combination of downlink transmitting beams. Or, selecting the combination of downlink transmitting beams includes: selecting reference signals belonging to a plurality of sets of reference signals among the Q reference signals as a group of reference signals, and determining downlink transmitting beams corresponding to reference signals in different groups of reference signals as the combination of downlink transmitting beams. Or, selecting the combination of downlink transmitting beams includes: selecting reference signals belonging to different sets of reference signals among the Q reference signals as a group of reference signals, where any two reference signals in the same group of reference signals do not belong to a same set of reference signals, and determining a combination of downlink transmitting beams corresponding to reference signals in the same group of reference signals as the combination of downlink transmitting beams.

According to an implementation mode of the embodiment of the disclosure, when the combination of downlink transmitting beams is selected and reported to the base station, it is identification information of the selected Q reference signals and information about groups of reference signals including the Q reference signals that is reported to the base station.

According to an implementation mode of the embodiment of the disclosure, the processor is further configured to read the program in the memory to control the transceiver to report an overall reception quality of groups of reference signals to the base station.

In FIG. 17, the bus architecture can include any number of interconnecting buses and bridges to particularly link together various circuits including one or more processors represented by the processor 1700, and one or more memories represented by the memory 1720. The bus architecture can further link together various other circuits, e.g., a peripheral device, a manostat, a power management circuit, etc., all of which are well known in the art, so a further description thereof is omitted in this context. The bus interface 1740 serves as an interface. The transceiver 1710 can be a number of elements, e.g., a transmitter and a receiver, which are units for communication with various other devices over a transmission medium. For different user equipment, the user interface 1730 can also be an interface via which devices are connected internally and externally as needed, and the connected devices include but will not be limited to a keypad, a monitor, a speaker, a microphone, a joystick, etc.

The processor 1700 is responsible for managing the bus architecture and performing normal processes, and the memory 1720 can store data for use by the processor 1700 when performing the operations.

In summary, in the technical solutions according to the embodiments of the disclosure, the sets of reference signals are configured so that the terminal can determine accurately which downlink beams can be used concurrently, and the base station and the terminal can obtain more accurate beam combination information to support multi-beam transmission.

The terminal herein can also be referred to as user equipment (hereinafter "UE"), a mobile station (hereinafter "MS"), a mobile terminal, a mobile telephone, and etc. The terminal can communicate with one or more core networks over a radio access network (hereinafter "RAN"). For example, the terminal can be a mobile phone (or referred to as a cell phone), a computer having a mobile character, and etc. The terminal can also be a portable, pocket, handheld, built-in-computer, or on-vehicle mobile device.

The base station can be configured to convert a received air frame into an internet protocol (hereinafter "IP") packet, and a received IP packet into an air frame, and can operate as a router between the radio terminal and the remaining components of the access network. The remaining components of the access network can include an IP network. The base station can further coordinate attribute management of the air interface. For example, the base station can be a base transceiver station (hereinafter "BTS") in a global system for mobile communications (hereinafter "GSM") or code division multiple access (hereinafter "CDMA" system, or can be a base station (Node B) in a wideband code division multiple access (hereinafter "WCDMA") system, or can be an evolved Node B (hereinafter "eNB" or "e-Node B") in an LTE system, or a gNB in a 5G system, although the embodiment of the disclosure is not limited thereto.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for obtaining transmitting beam information, comprising:

transmitting, by a base station, reference signals to a terminal using downlink transmitting beams, wherein the base station transmits one of the reference signals for each of the downlink transmitting beams, the reference signal of each of the downlink transmitting beams is transmitted after the downlink transmitting beam is formed using a beamforming weight corresponding to the downlink transmitting beam, and reference signals transmitted using downlink transmitting beams in a same group of downlink transmitting beams are grouped into a set of reference signals;

transmitting, by the base station, information about the sets of reference signals to the terminal;

receiving, by the base station, a combination of downlink transmitting beams reported by the terminal; and determining, by the base station, a downlink transmitting beam for transmitting data to the terminal, according to the combination of downlink transmitting beams.

2. The method according to claim 1, wherein when the base station transmits the reference signals to the terminal using the downlink transmitting beams in different groups of beams concurrently, downlink transmitting beams transmitted from a same transmitting and receiving point (TRP) are a group of beams; or downlink transmitting beams transmitted from a transceiver unit are a group of beams.

3. The method according to claim 1, wherein transmitting, by the base station, the reference signals to the terminal using the downlink transmitting beams comprises:

mapping the reference signal of one of the downlink transmitting beams onto all ports on all transmission occasions of a reference signal source, and transmitting the reference signal via the ports; or mapping the reference signal of one of the downlink transmitting beams onto all ports on at least one transmission occasion of a reference signal source, and transmitting the reference signal via the ports; or mapping the reference signal of one of the downlink transmitting beams onto at least one port on at least one transmission occasion of a reference signal source, and transmitting the reference signal via the port.

4. The method according to claim 1, wherein transmitting, by the base station, the information about the sets of reference signals to the terminal comprises:

notifying, by the base station, the terminal of configuration information of the sets of reference signals by notifying the terminal of configuration information of sets of reference signal resources when the base station configures the terminal with H sets of reference signal resources, an h-th set of the H sets comprises $N_h$ reference signal resources, the reference signal of one of the downlink transmitting beams is transmitted via all ports on all transmission occasions of one of the reference signal resources, both H and h are integers equal to or more than 1, and h<=H; or notifying, by the base station, the terminal of the configuration information of the sets of reference signals by notifying the terminal of the configuration information of the sets of reference signal resources and of antenna ports when the base station configures the terminal with F sets of reference signal resources, an f-th set of the F sets comprises $N_f$ reference signal resources, each of the reference signal resources has $N_p$ antenna ports, the reference signal of one of the downlink transmitting beams is transmitted via one of the antenna ports of each of the reference signal resources, both F and f are integers equal to or more than 1, and f<=F.

5. The method according to claim 1, wherein the combination of downlink transmitting beams received by the base station is identification information of Q reference signals selected by the terminal from the transmitted reference signals and information about groups of reference signals comprising the Q reference signals, wherein Q is an integer equal to or more than 1.

6. The method according to claim 1, further comprising:

receiving, by the base station, information about groups of reference signals transmitted by the terminal;

wherein determining, by the base station, the downlink transmitting beam for transmitting data to the terminal, according to the combination of downlink transmitting beams comprises:

determining, by the base station, that the downlink transmitting beams of two of the reference signals can be transmitted concurrently when the two reference signals belong to a same group of reference signals, wherein the downlink transmitting beams corresponding to the reference signals in the same group of reference signals constitute the combination of downlink transmitting beams; or determining, by the base station, that the downlink transmitting beam of two of the reference signals can be transmitted concurrently when the two reference signals belong to different groups of reference signals, wherein the downlink transmitting beams corresponding to the reference signals in different groups of reference signals constitute the combination of downlink transmitting beams.

7. A method for feeding back transmitting beam information, comprising:

receiving, by a terminal, reference signals transmitted by a base station using downlink transmitting beams, wherein the base station transmits one of the reference signals for each of the downlink transmitting beams, the reference signal of each of the downlink transmitting beams is transmitted after the downlink transmitting beam is formed using a beamforming weight corresponding to the downlink transmitting beam, and reference signals transmitted using downlink transmitting beams in a same group of beams are grouped into a set of reference signals;

selecting, by the terminal, Q reference signals from the received reference signals according to reception qualities thereof, and determining a receiving beam of each of the Q reference signals, wherein Q is an integer equal to more than 1; and receiving, by the terminal, information about the sets of reference signals transmitted by the base station, selecting a combination of downlink transmitting beams according to the information about the sets of reference signals, and reporting the combination of downlink transmitting beams to the base station.

8. The method according to claim 7, wherein reference signals of different downlink transmitting beams in the combination of downlink transmitting beams belong to different sets of reference signals.

9. The method according to claim 7, wherein selecting the combination of downlink transmitting beams comprises:

selecting reference signals belonging to a same set of reference signals among the Q reference signals as a group of reference signals, and determining downlink transmitting beams corresponding to reference signals in different groups of reference signals as the combination of downlink transmitting beams, wherein Q is an integer greater than or equal to 1; or selecting reference signals belonging to a plurality of sets of reference signals among the Q reference signals as a group of reference signals, and determining downlink transmitting beams corresponding to reference signals in different groups of reference signals as the combination of downlink transmitting beams, wherein Q is an integer greater than or equal to 1; or selecting reference signals belonging to different sets of reference signals among the Q reference signals as a group of reference signals, wherein any two reference signals in the same group of reference signals do not belong to a same set of reference signals, and determining a combination of downlink transmitting beams corresponding to reference signals in the same group of reference signals as the combination of downlink transmitting beams, wherein Q is an integer greater than or equal to 1.

10. The method according to claim 7, wherein reporting the combination of downlink transmitting beams to the base station comprises:

reporting, by the terminal, identification information of the selected Q reference signals, and information about groups of reference signals comprising the Q reference signals, wherein Q is an integer greater than or equal to 1.

11. A base station, comprising a processor, a transceiver, and a memory, wherein the processor is configured to read a program in the memory to perform following operations:

transmitting, via the transceiver, reference signals to a terminal using downlink transmitting beams, wherein one of the reference signals is transmitted for each of the downlink transmitting beams, the reference signal of each of the downlink transmitting beams is transmitted after the downlink transmitting beam is formed using a beamforming weight corresponding to the downlink transmitting beam, and reference signals transmitted using downlink transmitting beams in a same group of downlink transmitting beams are grouped into a set of reference signals;

transmitting, via the transceiver, information about the sets of reference signals to the terminal;

receiving, via the transceiver, a combination of downlink transmitting beams reported by the terminal; and determining a downlink transmitting beam for transmitting data to the terminal, according to the combination of downlink transmitting beams;

wherein the transceiver is configured to transmit and receive data under control of the processor.

12. The base station according to claim 11, wherein when the processor is further configured to read the program in the memory to transmit the reference signals to the terminal using the downlink transmitting beams in different groups of beams concurrently, downlink transmitting beams transmitted from a same TRP are a group of beams; or downlink transmitting beams transmitted from a transceiver unit are a group of beams.

13. The base station according to claim 11, wherein the processor is further configured to read the program in the memory to transmit the reference signals to the terminal using the downlink transmitting beams by:

mapping the reference signal of one of the downlink transmitting beams onto all ports on all transmission occasions of a reference signal source, and transmitting the reference signal via the ports; or mapping the reference signal of one of the downlink transmitting beams onto all ports on at least one transmission occasion of a reference signal source, and transmitting the reference signal via the ports; or mapping the reference signal of one of the downlink transmitting beams onto at least one port on at least one transmission occasion of a reference signal source, and transmitting the reference signal via the port.

14. The base station according to claim 11, wherein the processor is further configured to read the program in the memory to transmit, via the transceiver, the information about the sets of reference signals to the terminal by:

notify the terminal of configuration information of the sets of reference signals by notifying the terminal of configuration information of sets of reference signal resources when the terminal is configured with H sets of reference signal resources, an h-th set of the H sets comprises $N_h$ reference signal resources, the reference signal of one of the downlink transmitting beams is transmitted via all ports on all transmission occasions of one of the reference signal resources, both H and h are integers equal to or more than 1, and h<=H; or notify the terminal of the configuration information of the sets of reference signals by notifying the terminal of the configuration information of the sets of reference signal resources and of antenna ports when the terminal is configured with F sets of reference signal resources, an f-th set of the F sets comprises $N_f$ reference signal resources, each of the reference signal resources has $N_p$ antenna ports, the reference signal of one of the downlink transmitting beams is transmitted via one of the antenna ports of each of the reference signal resources, both F and f are integers equal to or more than 1, and f<=F.

15. The base station according to claim 11, wherein the received combination of downlink transmitting beams is identification information of Q reference signals selected by the terminal from the transmitted reference signals and information about groups of reference signals comprising the Q reference signals, wherein Q is an integer equal to or more than 1.

16. The base station according to claim 11, wherein the processor is further configured to read the program in the memory to:

receive, via the transceiver, information about groups of reference signals transmitted by the terminal; and the processor is further configured to read the program in the memory to determine the downlink transmitting beam for transmitting data to the terminal, according to the combination of downlink transmitting beams by:

determining that the downlink transmitting beams of two of the reference signals can be transmitted concurrently when the two reference signals belong to a same group of reference signals, wherein the downlink transmitting beams corresponding to the reference signals in the same group of reference signals constitute the combination of downlink transmitting beams; or determining that the downlink transmitting beam of two of the reference signals can be transmitted concurrently when the two reference signals belong to different groups of reference signals, wherein the downlink transmitting beams corresponding to the reference signals in different groups of reference signals constitute the combination of downlink transmitting beams.

17. A terminal, comprising a processor, a transceiver, and a memory, wherein:

the processor is configured to read a program in the memory to perform following operations:

receiving, via the transceiver, reference signals transmitted by a base station using downlink transmitting beams, wherein the base station transmits one of the reference signals for each of the downlink transmitting beams, the reference signal of each of the downlink transmitting beams is transmitted after the downlink transmitting beam is formed using a beamforming weight corresponding to the downlink transmitting beam, and reference signals transmitted using downlink transmitting beams in a same group of beams are grouped into a set of reference signals;

selecting Q reference signals from the received reference signals according to reception qualities thereof, and determining a receiving beam of each of the Q reference signals, wherein Q is an integer equal to more than 1; and receiving, via the transceiver, information about the sets of reference signals transmitted by the base station, selecting a combination of downlink transmitting beams according to the information about the sets of reference signals, and reporting the combination of downlink transmitting beams to the base station;

wherein the transceiver is configured to transmit and receive data under control of the processor.

18. The terminal according to claim 17, wherein reference signals of different downlink transmitting beams in the combination of downlink transmitting beams belong to different sets of reference signals.

19. The terminal according to claim 17, wherein the processor is further configured to read the program in the memory to:
- select reference signals belonging to a same set of reference signals among the Q reference signals as a group of reference signals, and determine downlink transmitting beams corresponding to reference signals in different groups of reference signals as the combination of downlink transmitting beams, wherein Q is an integer greater than or equal to 1; or
- select reference signals belonging to a plurality of sets of reference signals among the Q reference signals as a group of reference signals, and determine downlink transmitting beams corresponding to reference signals in different groups of reference signals as the combination of downlink transmitting beams, wherein Q is an integer greater than or equal to 1; or
- select reference signals belonging to different sets of reference signals among the Q reference signals as a group of reference signals, wherein any two reference signals in the same group of reference signals do not belong to a same set of reference signals, and determine a combination of downlink transmitting beams corresponding to reference signals in the same group of reference signals as the combination of downlink transmitting beams, wherein Q is an integer greater than or equal to 1.

20. The terminal according to claim 17, wherein the processor is further configured to read the program in the memory to:
- report, via the transceiver, identification information of the selected Q reference signals, and information about groups of reference signals comprising the Q reference signals, wherein Q is an integer greater than or equal to 1.

* * * * *